United States Patent
Ikebe et al.

(10) Patent No.: US 8,422,815 B2
(45) Date of Patent: Apr. 16, 2013

(54) IMAGE PROCESSING APPARATUS, IMAGE PROCESSING METHOD AND IMAGE PROCESSING PROGRAM

(75) Inventors: Masayuki Ikebe, Hokkaido (JP); Sousuke Shimoyama, Hokkaido (JP); Kensuke Yamaoka, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 314 days.

(21) Appl. No.: 12/914,195

(22) Filed: Oct. 28, 2010

(65) Prior Publication Data

US 2011/0268358 A1    Nov. 3, 2011

(30) Foreign Application Priority Data

Oct. 30, 2009 (JP) ................................. 2009-251074

(51) Int. Cl.
*G06K 9/64* (2006.01)
(52) U.S. Cl.
USPC .......................................................... 382/274
(58) Field of Classification Search .................. None
See application file for complete search history.

(56) References Cited

U.S. PATENT DOCUMENTS

2007/0229863 A1* 10/2007 Ono et al. ...................... 358/1.9
2010/0157078 A1*  6/2010 Atanassov et al. ......... 348/222.1

FOREIGN PATENT DOCUMENTS

JP             4214457         11/2008

* cited by examiner

*Primary Examiner* — Claire X Wang
*Assistant Examiner* — Ryan Potts
(74) *Attorney, Agent, or Firm* — Young & Thompson

(57) ABSTRACT

In an image processing technology, an original image is inputted by accepting an input of an original image to be image-processed; a local area is set, with a pixel of which brightness is to be converted being a center of the local area, from the original image; a local histogram relating to brightness of the local area is calculated; a local cumulative histogram is calculated by accumulating the local histogram; first and second monotone increasing functions are determined, respectively, corresponding to cumulative frequency values in first and second classes of the local cumulative histogram; first and second weighting functions are determined, respectively, corresponding to the first and second monotone increasing functions; a conversion function relating to brightness of the pixel is produced from the first monotone increasing function weighted by the first weighting function and the second monotone increasing function weighted by the second weighting function; and the brightness of the pixel is then converted by the conversion function.

12 Claims, 36 Drawing Sheets

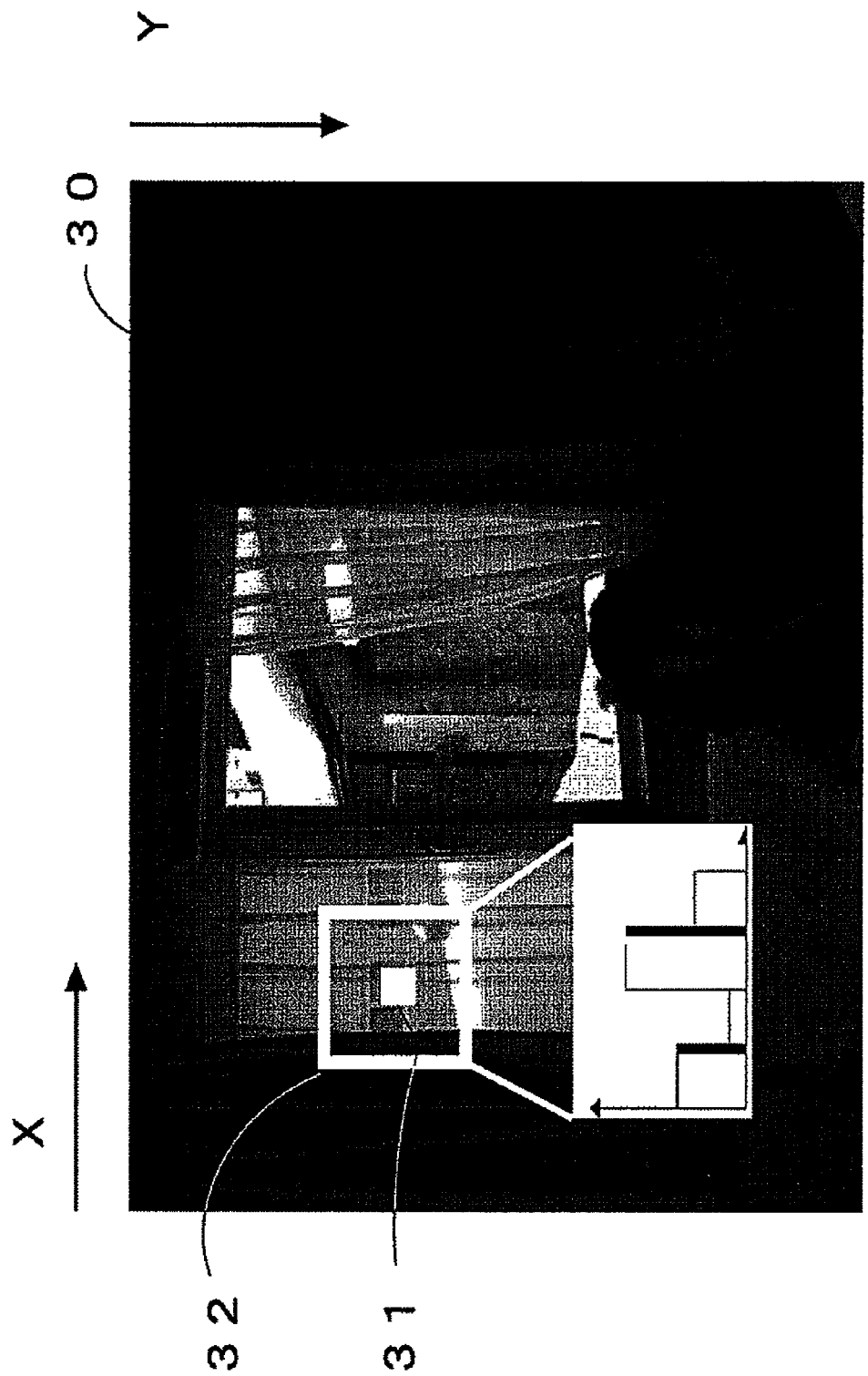

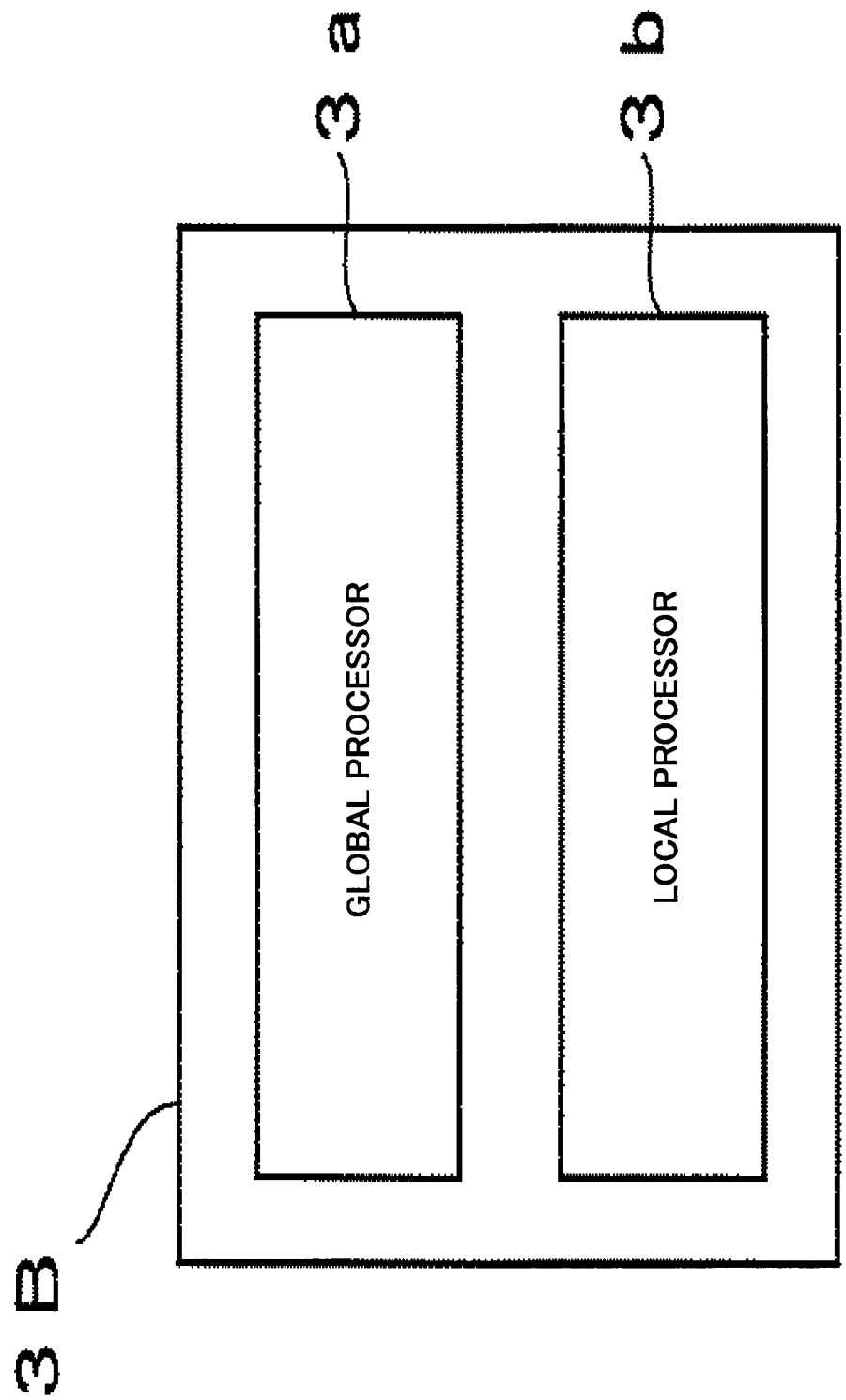

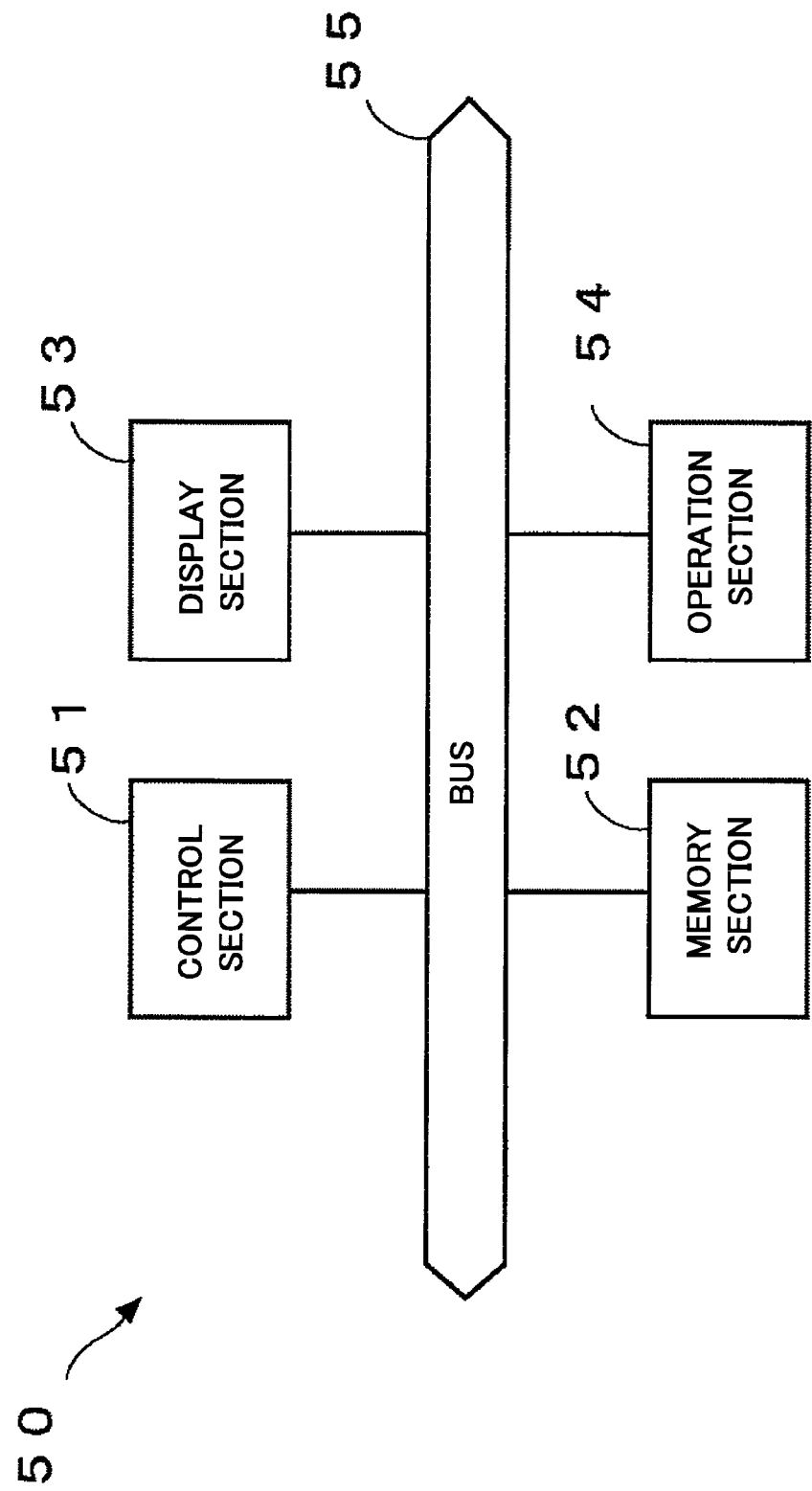

IMAGE PROCESSING APPARATUS, IMAGE PROCESSING METHOD AND IMAGE PROCESSING PROGRAM

BACKGROUND OF THE INVENTION

1. Field of the Invention

The present invention relates to an image processing apparatus, an image processing method and an image processing program for performing image correction of gradation with respect to an image.

2. Related Art

In an image correction or modification technology photographed by a camera such as commercially-sold digital still camera and wide dynamic range (having expressive power more than 8 bit per each color of RGB) camera, many attentions have been paid on a technology for improving brightness such as luminance, lightness or like. In order to improve such deviation as luminance, correction utilizing single brightness character is mainly performed, and as a function for correcting the brightness character, a gamma (γ) correction function, a logarithmic function, a function defined by using statistical processing such as a histogram averaging or like has been utilized.

Furthermore, in accordance with popularization of broadband internet connection of such as optical fiber or high resolution of moving pictures in a high definition television broadcasting, machineries such as digital still cameras or digital video cameras have been highly qualified from several mega pixel to giga pixel, and according to such tendency, it has been required for an image to be processed or treated at a high speed.

In order to achieve such requirements, it is required to properly stress image contrast at high speed, and for example, Patent Publication 1 (Japanese Patent Publication No. 4214457) discloses a following image processing device for obtaining gradation compressed images. In this image processing device, luminance of an image of wide dynamic range is subjected to logarithmic conversion. In a next step, logarithmic tone curve correction image is produced. Subsequently, a logarithmically reduced image is produced, and thereafter, luminance of a logarithmically smoothed image is calculated by an interpolation operation.

In a further next step, gain values are calculated with respect to respective pixel positions. Thereafter, the luminance of the pixel of the logarithmically gradation compressed image is calculated, and the luminance is subjected to logarithmically reverse conversion.

However, when a whole image is divided into blocks and the blocks are then processed respectively for highly speedup of the image processing, block noise is generated. In addition, in a conventional image correction technology, when blacked portions in an image are corrected, unnatural portions may be produced in a contour portion of the image or an area in which specified luminance is concentrated. Thus, it may be said that the conventional technology was not sufficient.

SUMMARY OF THE INVENTION

The present invention was conceived in consideration of the circumstances encountered in the conventional technology mentioned above and an object thereof is to provide an image processing apparatus, an image processing method and an image processing program capable of properly converting brightness of respective pixels of an image at high speed.

This and other objects can be achieved by providing, in one aspect of the present invention, an image processing apparatus including:

an original image inputting unit that accepts an input of an original image to be image-processed;

a local area setting unit that sets a local area, with a pixel of which brightness is to be converted being a center of the local area, from the original image;

a local histogram calculating unit that calculates a local histogram relating to brightness of the local histogram;

a local histogram calculating unit that calculates a local cumulative histogram by accumulating the local histogram;

a monotone increasing function determining unit that determines first and second monotone increasing functions, respectively, corresponding to cumulative frequency values in first and second classes of the local cumulative histogram;

a weighting function determining unit that determines first and second weighting functions, respectively, corresponding to the first and second monotone increasing functions;

a conversion function producing unit that produces a conversion function relating to brightness of the pixel from the first monotone increasing function weighted by the first weighting function and the second monotone increasing function weighted by the second weighting function; and a conversion unit that converts the brightness of the pixel by the conversion function.

The image processing apparatus of the above aspect may include the following preferred embodiments.

It may be desired that the monotone increasing function determining unit is a unit that determines at least one of the first and second monotone increasing functions to a gamma correction function, or it may be desired that the monotone increasing function determining unit is a unit that determines at least one of the first and second monotone increasing functions to a linear function.

It may be desired that the local histogram calculating unit is a unit that sets a width of a class of the local histogram based on information of the original image and then calculates the local histogram based on the class width of the thus set local histogram. It may be also desired that the local histogram calculating unit is a unit that sets a width of a class of the local histogram based on histogram relating to brightness of the original image and then calculates the local histogram based on the class width of the thus set local histogram.

It may be desired that the function producing unit is a unit that produces the conversion function by adding the first monotone increasing function weighted by the first weighting function and the monotone increasing function weighted by the second weighting function.

It may be desired that the weighting function determining unit is a unit that changes an overlapping ratio of the first and second weighting functions.

It may be desired that the weighting function determining unit is a unit that determines the first weighting function having a local maximal value in the first class and the second weighting function having a local maximal value in the second class.

The image processing apparatus may further comprise a local cumulative histogram adjusting unit that adjusts a cumulative frequency value in a class of the local cumulative histogram. It may be also desired that the local cumulative histogram adjusting unit is a unit that adjusts the cumulative frequency value by setting upper and lower limits of the cumulative frequency values in the class of the local cumulative histogram.

In another aspect of the present invention, there is also provided an image processing method including:

inputting an original image by accepting an input of an original image to be image-processed;

setting a local area, with a pixel of which brightness is to be converted being a center of the local area, from the original image;

calculating a local histogram relating to brightness of the local area;

calculating a local cumulative histogram by accumulating the local histogram;

determining first and second monotone increasing functions, respectively, corresponding to cumulative frequency values in first and second classes of the local cumulative histogram;

determining first and second weighting functions, respectively, corresponding to the first and second monotone increasing functions; and producing a conversion function relating to brightness of the pixel from the first monotone increasing function weighted by the first weighting function and the second monotone increasing function weighted by the second weighting function.

In a further aspect of the present invention, there is also provided an image processing program that causes a computer to operate as:

an original image inputting unit that accepts an input of an original image to be image-processed;

a local area setting unit that sets a local area, with a pixel of which brightness is to be converted being a center of the local area, from the original image;

a local histogram calculating unit that calculates a local histogram relating to brightness of the local histogram;

a local histogram calculating unit that calculates a local cumulative histogram by accumulating the local histogram;

a monotone increasing function determining unit that determines first and second monotone increasing functions, respectively, corresponding to cumulative frequency values in first and second classes of the local cumulative histogram;

a weighting function determining unit that determines first and second weighting functions, respectively, corresponding to the first and second monotone increasing functions; and a conversion function producing unit that produces a conversion function relating to brightness of the pixel from the first monotone increasing function weighted by the first weighting function and the second monotone increasing function weighted by the second weighting function.

According to the present invention of the characters mentioned above, in an image processing technology: an original image is inputted by accepting an input of an original image to be image-processed; a local area is set, with a pixel of which brightness is to be converted being a center of the local area, from the original image; a local histogram relating to brightness of the local area is calculated; a local cumulative histogram is calculated by accumulating the local histogram; first and second monotone increasing functions are determined, respectively, corresponding to cumulative frequency values in first and second classes of the local cumulative histogram; first and second weighting functions are determined, respectively, corresponding to the first and second monotone increasing functions; a conversion function relating to brightness of the pixel is produced from the first monotone increasing function weighted by the first weighting function and the second monotone increasing function weighted by the second weighting function; and the brightness of the pixel is then converted by the conversion function. Accordingly, there can be provided an image processing apparatus, an image processing method and an image processing program capable of appropriately converting the brightness of the respective pixels at high speed, thus being effective and advantageous.

The nature and further characteristic features of the present invention will be made clearer from the following descriptions made with reference to the accompanying drawings.

BRIEF DESCRIPTION OF THE DRAWINGS

In the accompanying drawings:

FIG. 6 includes pattern diagrams in which

FIG. 7 includes FIGS. 7A and 7B, in which FIG. 7A is a pattern diagram showing one example of a local area in which a certain pixel of which luminance will be converted is positioned at a center of the area in the original image shown in FIG. 6A.

FIG. 14 includes FIGS. 14A and 14B, in which

FIG. 25 includes FIG. 25A, FIG. 25B and FIG. 25C, in which

FIG. 26 is a block diagram showing an example of a schematic structure of an image processing unit of an image processing apparatus according to a third embodiment of the present invention;

FIG. 28 includes FIG. 28A and FIG. 28B, in which

FIG. 30 shows a block diagram representing one example of a schematic structure of a computer executing an image processing program according to the present invention.

DESCRIPTION OF THE PREFERRED EMBODIMENT

Preferred embodiments for embodying the present invention will be described hereunder with reference to the accompanying drawings.

First Embodiment

A schematic structure and function of an image processing apparatus of a first embodiment according to the present invention will be first described hereunder with reference to the drawings.

Figure 1:
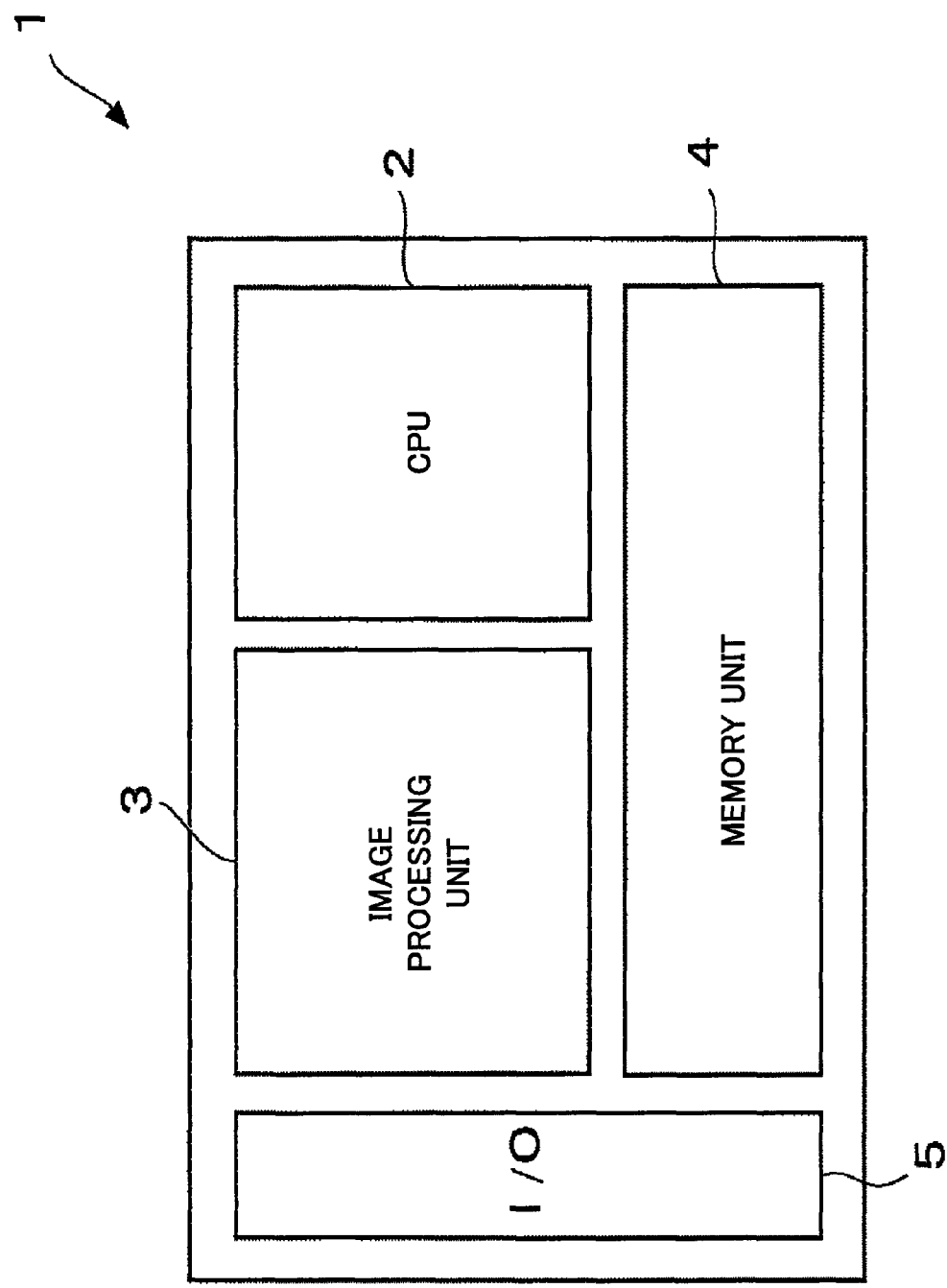
FIG. 1 is a block diagram showing an example of a schematic structure of an image processing apparatus according to a first embodiment of the present invention.

FIG. 1 is a block diagram showing an example of a schematic structure of the image processing apparatus according to the first embodiment of the present invention.

With reference to FIG. 1, an image processing apparatus 1 is an LSI (Large Scale Integration) for an image processing and includes a CPU (Central Processing Unit) 2, an image processing unit 3 for carrying out dedicated image processing operation, a memory unit 4 for storing image data or like, and an input/output unit 5 for inputting image data to be processed and outputting processed result. These units are integrally arranged on a same die and internally connected through internal bus, not shown, in the image processing apparatus 1.

The CPU 2 includes a calculator, a register, etc, for executing various programs, controlling inputting/outputting of data via the input/output unit 5, commanding the image processing to the image processing unit 3, and controlling a main memory outside the image processing apparatus 1.

The image processing unit 3 includes a logic circuit, a line memory, a shift register and the like, and serves to extract, from an original image, a local area with a center of pixel for performing conversion of luminance, brightness and the like, to calculate a local histogram relating to brightness in the local area, to produce a conversion function of the brightness of the pixel, and to perform other operations so as to perform the dedicated image processing in accordance with command from the CPU unit 2. The image processing unit 3 further includes a circuit as local histogram calculating means for calculating the local histogram sequentially at high speed.

The memory unit 4 includes a DRAM (Dynamic Random Access Memory) and so on and serves to function as a frame memory for storing the image.

Next, the local histogram calculating means provided for the image processing unit 3 will be explained with reference to the drawings.

Figure 2:
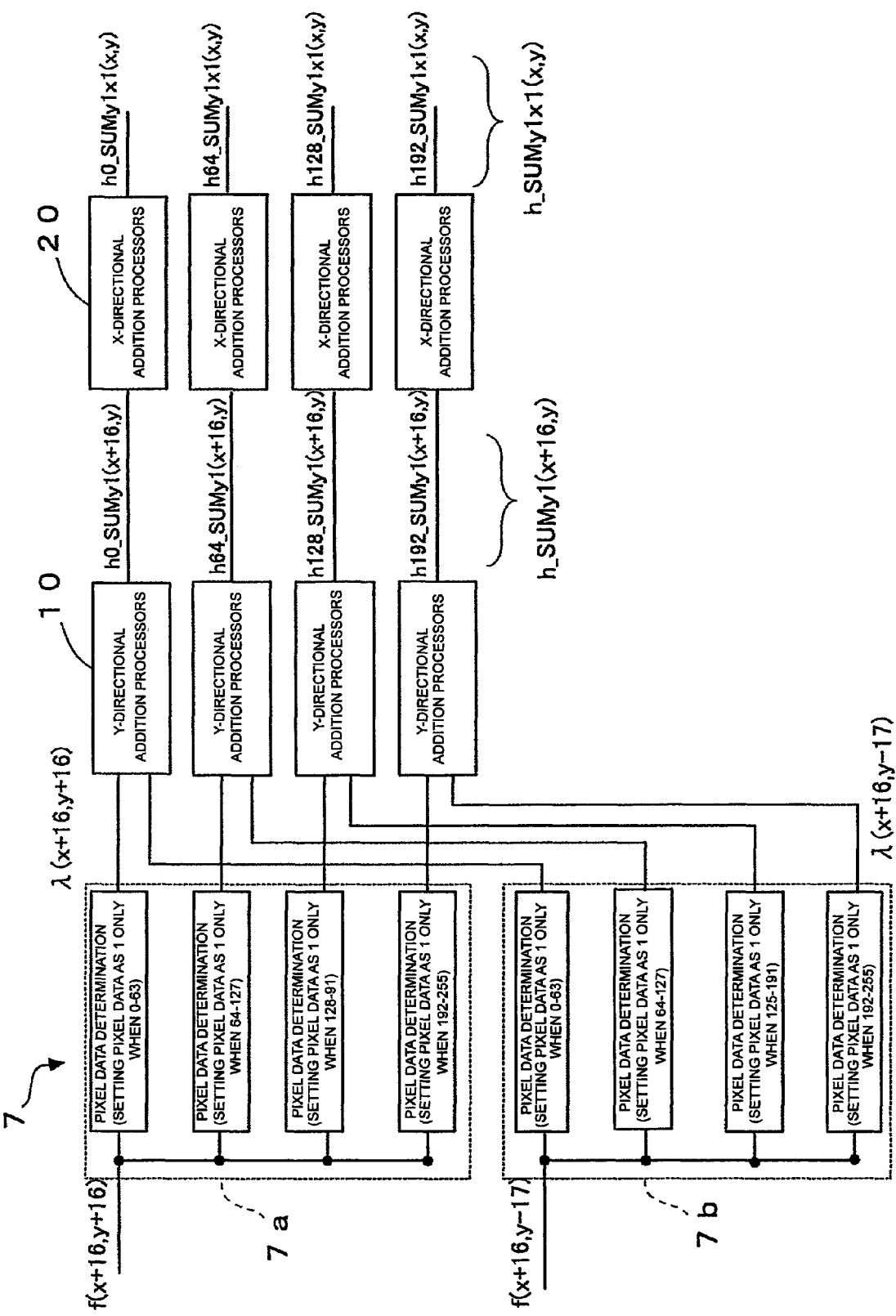
FIG. 2 is a block diagram showing an example of a schematic structure of a local histogram calculating unit of the image processing apparatus of FIG. 1.

FIG. 2 is a block diagram showing the schematic structure of the local histogram calculating means of the image processing unit 3, in which an X-direction is a scanning direction of the original image as an object to be image-processed, and a Y-direction is a direction in which the original image is scanned in the X-direction and when the original image reaches an end of the X-direction, the scanning is performed to move one pixel sequentially in the Y-direction.

As shown in FIG. 2, the image processing unit 3 further includes a distributor 7 (distributors 7a, 7b) distributing the pixel data in accordance with the pixel data of the original image, a Y-directional addition processor 10 processing the pixel data from the distributor 7, and an X-directional addition processor 20 processing the pixel data from the Y-directional addition processor 10.

The distributor 7 sets the number of distribution and a range of the luminance or like in accordance with bin number of the histogram and then has an output ends corresponding to the bin number. The Y-directional addition processor 10 is connected to each output end of the distributor 7. Further, output ends of two distributors 7a, 7b having the same pixel data value range are connected to the input end of each Y-directional addition processor 10, and each of the X-directional addition processors 20 is connected to each of the Y-directional addition processors 10.

The image data f of the original image separated by a several tap numbers (TAP1) in the Y-direction is input to the respective distributors 7a, 7b, and in accordance with the value of the pixel data, the distributor 7 outputs the value "1" corresponding to the value.

Then, the image processing unit 3 processes the output from the distributor 7 by the Y- and X-directional addition processors 10 and 20 and calculates the local histogram in a square area of the tap number TAP1.

As mentioned above, the distributor 7 functions as one example of a distributing unit distributing the pixel data in accordance with the pixel data of the original image. Further, an adder of the Y-directional addition processor 10 functions as one example of a first adder adding the pixel data from the output side to the input pixel data from the distributor 7, and a subtracter of the Y-directional addition processor 10 functions as one example of a first subtracter subtracting a second input pixel data from the distributor 7 from the pixel data from the first adder and externally outputting a first output pixel data.

Furthermore, the line memory of the Y-directional addition processor 20 functions as one example of a first memory sequentially storing the first output pixel data of several numbers of the pixels in the scanning direction of the original image and sequentially outputting the stored pixel data to the first adder.

On the other hand, an adder of the X-directional addition processor 20 functions as one example of a second adder adding the pixel data from the output side to a third input pixel data from the first addition processor 10, and a shift register of the X-directional addition processor 20 functions as one example of a third memory sequentially storing the third output pixel data of the numbers of the pixels to be added and sequentially outputting the stored pixel data.

Furthermore, a subtracter of the X-directional addition processor 20 functions as one example of a second subtracter subtracting the third input pixel data before the scanning of the pixel numbers to be added from the pixel data from the second adder and externally outputting the second output pixel data, and a memory of the X-directional addition processor 20 functions as one example of a second memory storing one pixel of the second output pixel data and outputting the stored data to the second adder.

The schematic structure and function of the Y-directional first-order addition processor 10 will be explained hereunder with reference to the drawings.

Figure 3:
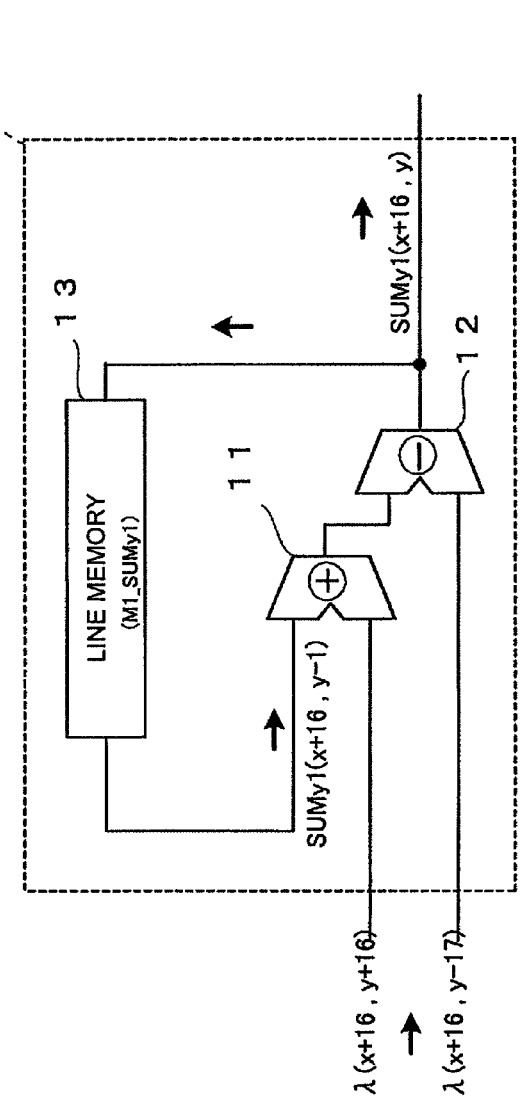
FIG. 3 is a block diagram showing an example of a schematic structure of a first-order addition processor in a Y-direction shown in FIG. 2.

FIG. 3 is a block diagram showing the schematic structure of the Y-directional first-order addition processor 10, in which one of the first-order addition processors 10 in the previous stage shown in FIG. 1 is explained as example.

As shown in FIG. 3, the first-order addition processor 10 includes an adder 11 adding an input data f(x+16, y+16) from the input side and a pixel data SUMy1(x+16, y−1) fed back from the output side, a subtracter 12 subtracting an input pixel data λ(x+16, y−11) from the input side from the output pixel data from the adder 11, and a line memory 13 sequentially storing an output pixel data SUMy1 (x+16, y) from the subtracter 12 by the numbers corresponding to the pixel number in the X-direction of the original image. Further, it is to be noted that the coordinate of the image data is one example.

The adder 11 is, for example, an adder for a plurality of bits constituted by a half adder, a full adder and the like and serves to add binary number of optional digits.

The line memory 13 is one example of the first memory for storing the pixel data corresponding to a length of the line in the X-direction of the original image, and functions as a shift register which stores the output pixel data SUMy1 (x+16, y) from the subtracter 12 and outputs the pixel data (x+16, y−1), delayed by one line, to the adder 11. Here, the image processing apparatus 1 scans by every one pixel in the X-direction and outputs the pixel data delayed by one line, so that the line memory 13 outputs the pixel data delayed by one line minus pixel data in the Y-direction. Further, the line memory 13 may be composed of a dual-port memory having ports for lead and light. A controller instructs the line memory 13 to store the output pixel data from the subtracter 12 from the port for the light, and instructs to read out and then erase the pixel data to be output to the adder 11 from the port for the lead.

The input of the first-order addition processor 10 is composed of one input end of the adder 11 and one input end of the subtracter 12. The output end of the adder 11 is connected to the input end of the subtracter 12, and the output end of the subtracter 12 forms an output end outputting externally of the first-order addition processor 10, and a branch from this output end is connected to the input end of the line memory 13. The output end of the line memory 13 is then connected to the input end of the adder 11. Here, one of the first-order addition processors 10 of the first stage as prior stage is a circuit realizing an operation of the following Equation 1.

[Equation 1]

$$SUM_{y1}(x+16,y) = SUM_{y1}(x+16,y-1) - \lambda(x+16,y-17) + \lambda(x+16,y+16) \quad (1)$$

This Equation 1 is an equation based on Box-Filtering System (M. J. McDonnell, Box-Filtering Techniques, Compute Graph Image Process. 17(1) (1981), pp 65-70). In this equation, λ(x, y) is an output of a distributor 7 corresponding to the pixel f (x, y), and SUMy1 is a sum of the λ(x, y) as shown in the following Equation 2.

[Equation 2]

$$SUM_{y1}(x, y) = \sum_{q=y-K1}^{y+K1} \lambda(x, q) \quad (2)$$

Herein, term number of the sum is considered as tap number, and a case of first-order addition processing is considered as TAP=2×K1+1. The Equation 1 is a case of K1=16 and the tap number of TAP1=3.3.

As mentioned above, the adder 11 functions as one example of the first adder which adds the first input pixel data related to the original image and the pixel data from the output side, the subtracter 12 functions as one example of the first subtracter which subtracts the second input pixel data related to the original image from the pixel data from the first adder and then externally outputs the first output pixel data, and the line memory 13 functions as one example of the first memory which stores subsequently the first output pixel data by the numbers corresponding to the pixel numbers in the scanning direction in the original image and then subsequently outputs the data to the first adder.

Next, the schematic structure and functions of the first-order addition processor 20 in the X-direction will be described with reference to the drawings.

Figure 4:
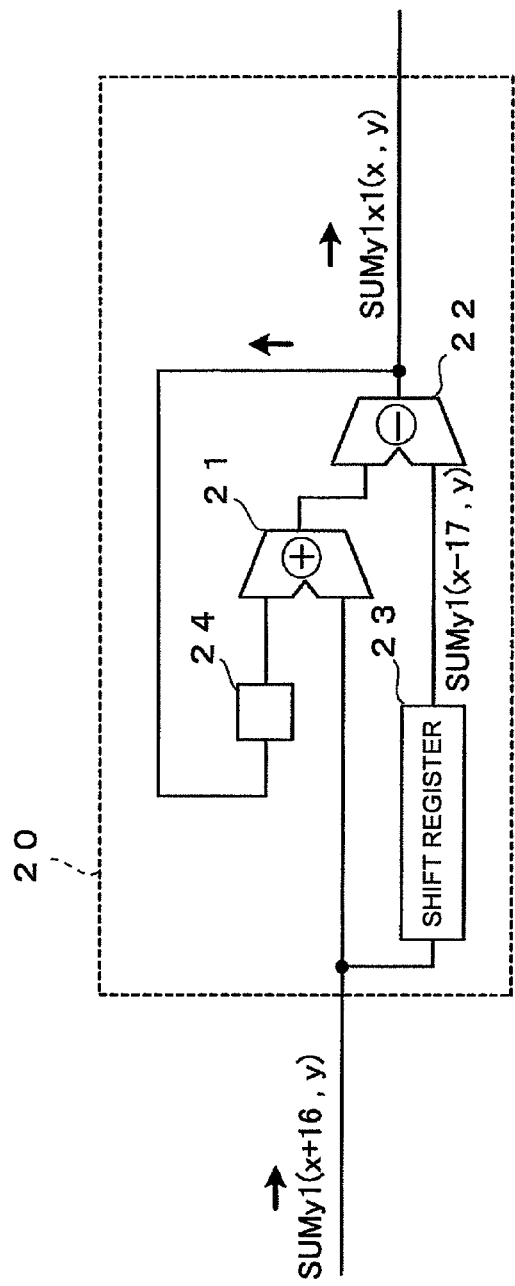
FIG. 4 is a block diagram showing an example of a schematic structure of a first-order addition processor in an X-direction shown in FIG. 2.

FIG. 4 is a block diagram representing a schematic structure of the first-order addition processor 20 in the X-direction, in which the prior-stage first-order addition processor 20 prior to the directly connected first-order addition processor 20 is explained as one example of the pixel data to be input to the first-order addition processor 20.

As shown in FIG. 4, the X-directional first-order addition processor 20 includes an adder 21 adding the input pixel data SUMy1 (x+16, y) from the input side and the pixel data SUMy1x1 (x+16, y−1) fed back from the output side, a subtracter 22 subtracting the input pixel data SUMy1 (x−17, y) from the input side shift-registered from the pixel data from the adder 21 and then externally outputting second output pixel data SUMy1x1 (x, y), a shift register 23 shift-registering the input pixel data SUMy1 (x+16, y) from the input side, and a memory 24 storing one pixel of the output pixel data from the subtracter 22 and outputting the pixel data SUMy1x1 (x+16, y−1) to the adder 21. Further, it is to be noted that the coordinate of the pixel data is one example.

The adder 21 has a structure and functions identical to those of the adder 11, and the subtracter 22 also has a structure and functions identical to those of the subtracter 12.

The shift register 23 is one example of a third memory for storing the pixel data corresponding to the tap numbers and functions as a shift register outputting the pixel data SUMy1 (x−17, y) delayed by the tap numbers to the subtracter 22. Herein, the image processing apparatus 1 scans one by one (one pixel by one pixel) in the X-direction, and in a case of the tap number of 33, scans by 33 pixels in the X-direction, and accordingly, pixel data which is shifted by 33 pixels in the X-direction is output.

The memory 24 is a delay element storing one pixel.

The input of the first-order addition processor 20 is connected to the input ends of the adder 21 and the shift register 23. The output ends of the adder 21 and the shift register 23 are connected to the input end of the subtracter 22, the output end of the subtracter 22 constitutes an output end outputting the pixel data to an outside of the first-order addition processor 20, and a branched portion thereof is connected to the input end of the memory 24. The output end of the memory is connected to the input end of the adder 21.

Herein, the first-order addition processor 20 is a circuit which realizes the operation of the following Equation 3.

[Equation 3]

$$SUM_{y1x1}(x,y) = SUM_{y1x1}(x-1,y) - SUM_{y1}(x-17,y) + SUM_{y1}(x+16,y) \quad (3)$$

In this Equation 3, the f(x, y) is an image data of a pixel of the coordinate (x, y) of the original image, and the SUMy1x1 is a sum of SUMy1 as shown by the following Equation 4.

[Equation 4]

$$SUM_{y1x1}(x, y) = \sum_{p=x-K1}^{x+K1} SUM_{y1}(p, y) \quad (4)$$

Here, the item number of the sum is considered to the tap number, and in the case of the first-order addition processing, TAP=2×K1+1. In this embodiment, K1=16 and the tap number TAP1 is 33.

As mentioned above, the adder 21 functions as one example of the second adder adding the third input pixel data passing through the first addition processor and the pixel data from the output side. The subtracter 22 functions as one example of the second subtracter subtracting the third input pixel data before the scanning by the numbers corresponding to the pixel numbers to be added from the pixel data from the second adder and then externally outputting the second output pixel data. The shift register 23 functions as one example of the third memory subsequently storing the third input pixel data of the certain memory numbers corresponding to the pixel numbers (tap numbers) to be added, and the memory 24 functions as one example of the second memory storing one pixel of the second output pixel data and then outputting to the second adder.

In the above operations, in the case of the first-stage Y-directional first-order addition processor 10 (first addition processor), the first input pixel data and the second input pixel data are the pixel data λ of the original image, and in the case of the Y-directional first-order addition processor after the second stage, the first input pixel data and the second input pixel data are the output pixel data from the first-order addition processor 10 in the prior stage, that is, the first output pixel data. The third input pixel data is, in the case of the first-stage X-directional first-order addition processor 20 (second addition processor), the output pixel data from the first-order addition processor 10, and in the case of the X-directional first-order addition processor 20 after the second stage, the third input pixel data is the output pixel data from the prior stage first-order addition processor 20, that is, the second output pixel data.

As mentioned above, the third input pixel data is the data from the Y-directional first-order addition processor 10 and the data at least passing through the Y-directional first-order addition processor 10. The output side data means the pixel data branching from the output of the addition processor and returning through the memory, and in the case of the Y-directional first-order addition processor 10 (first addition processor), the output side pixel data means the pixel data from the subtracter 12, and in the case of the X-directional first-order addition processor 20 (second addition processor), the output side pixel data means the pixel data from the subtracter 22.

Hereunder, an example of the operation of the image processing apparatus 1 will be described with reference to FIGS. 5 to 12.

Figure 5:
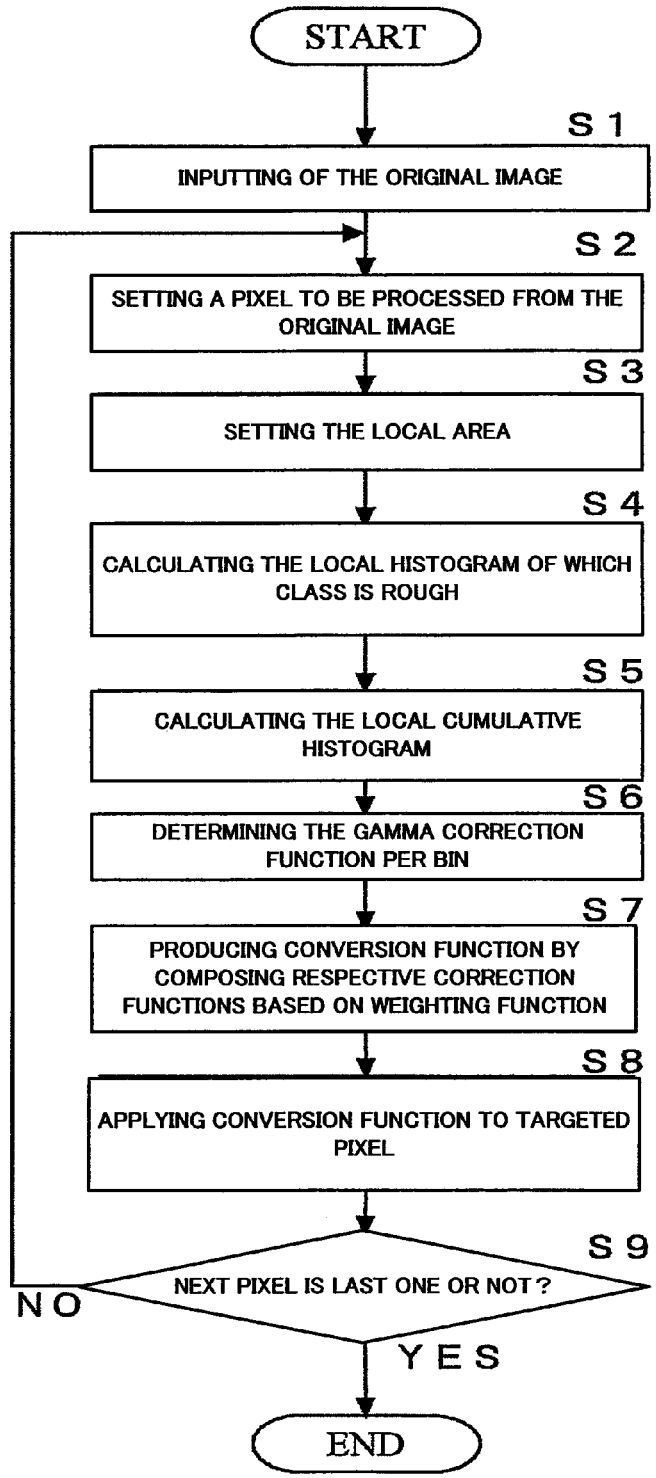
FIG. 5 is a flowchart showing an operation example by the image processing apparatus shown in FIG. 1.
Figure 6A:
FIG. 6A is a pattern diagram showing one example of an original image to be image-processed by the image processing apparatus shown in FIG. 1.
Figure 6B:
FIG. 6B is a pattern diagram showing one example of an image after the image processing of the original image of FIG. 6A.
Figure 7B:
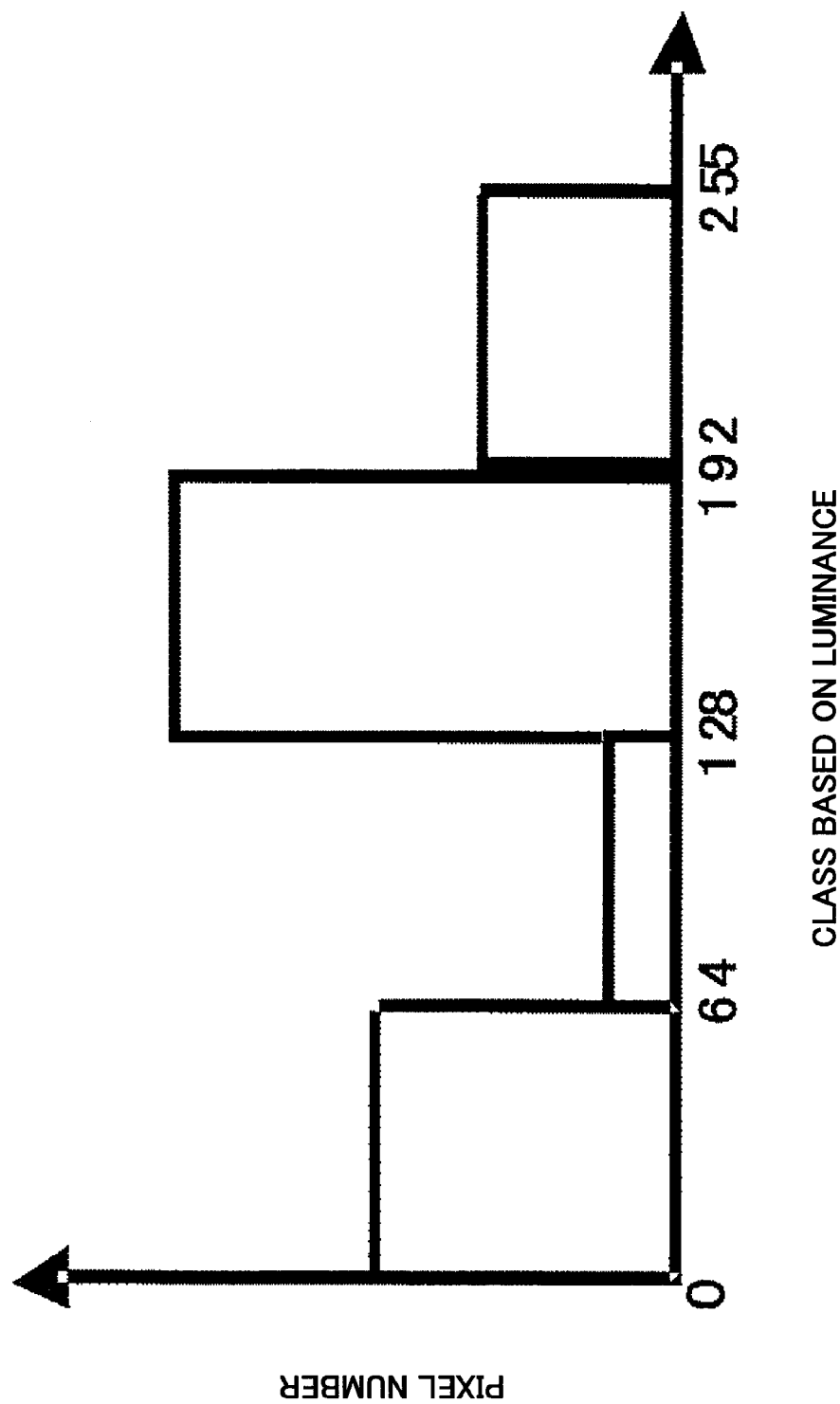
FIG. 7B is a diagram showing one example of a local histogram in the local area shown in FIG. 7A.
Figure 8:
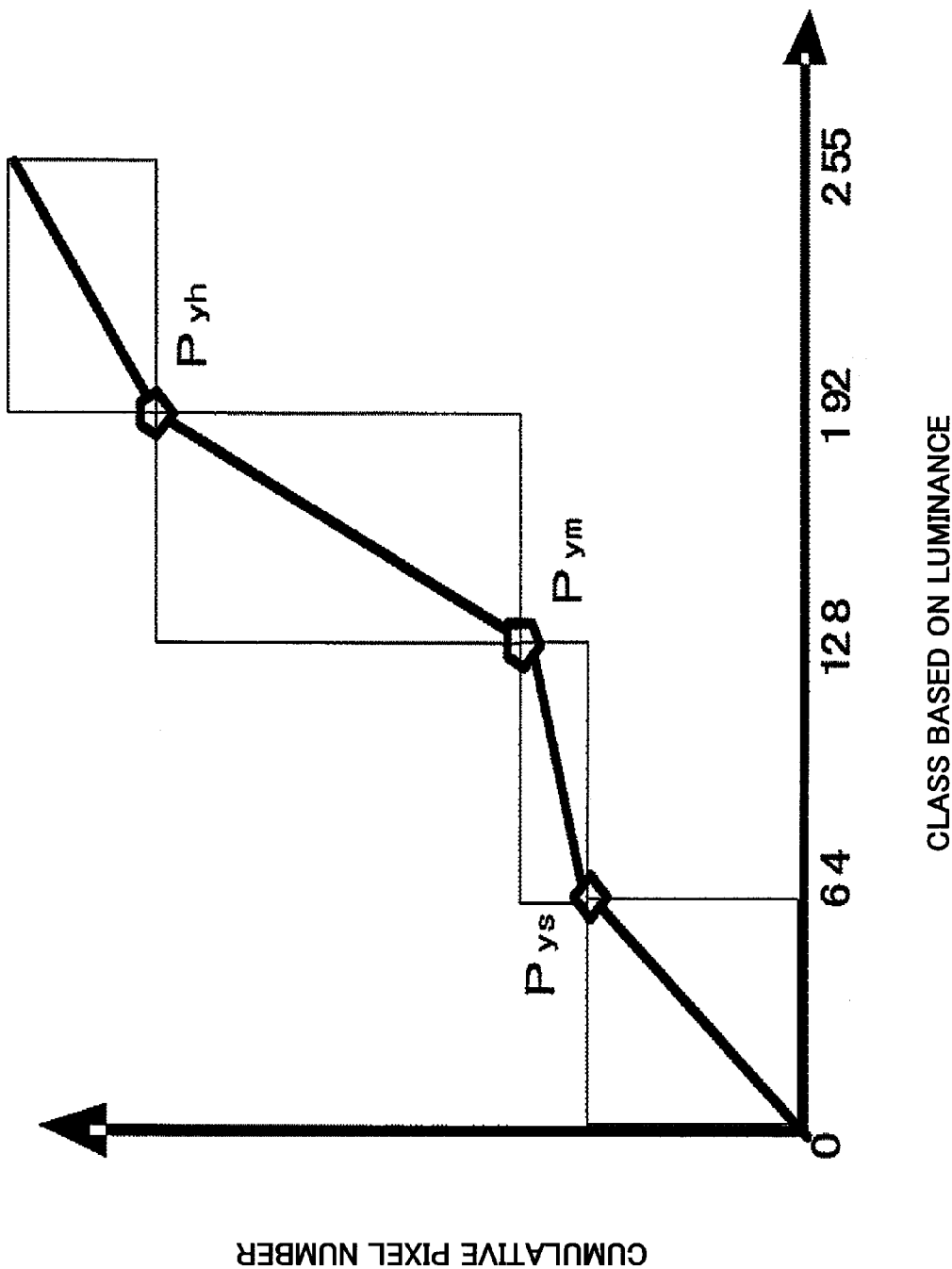
FIG. 8 is a diagram showing one example of a local cumulative histogram with respect to the local histogram shown in FIG. 7B.
Figure 9:
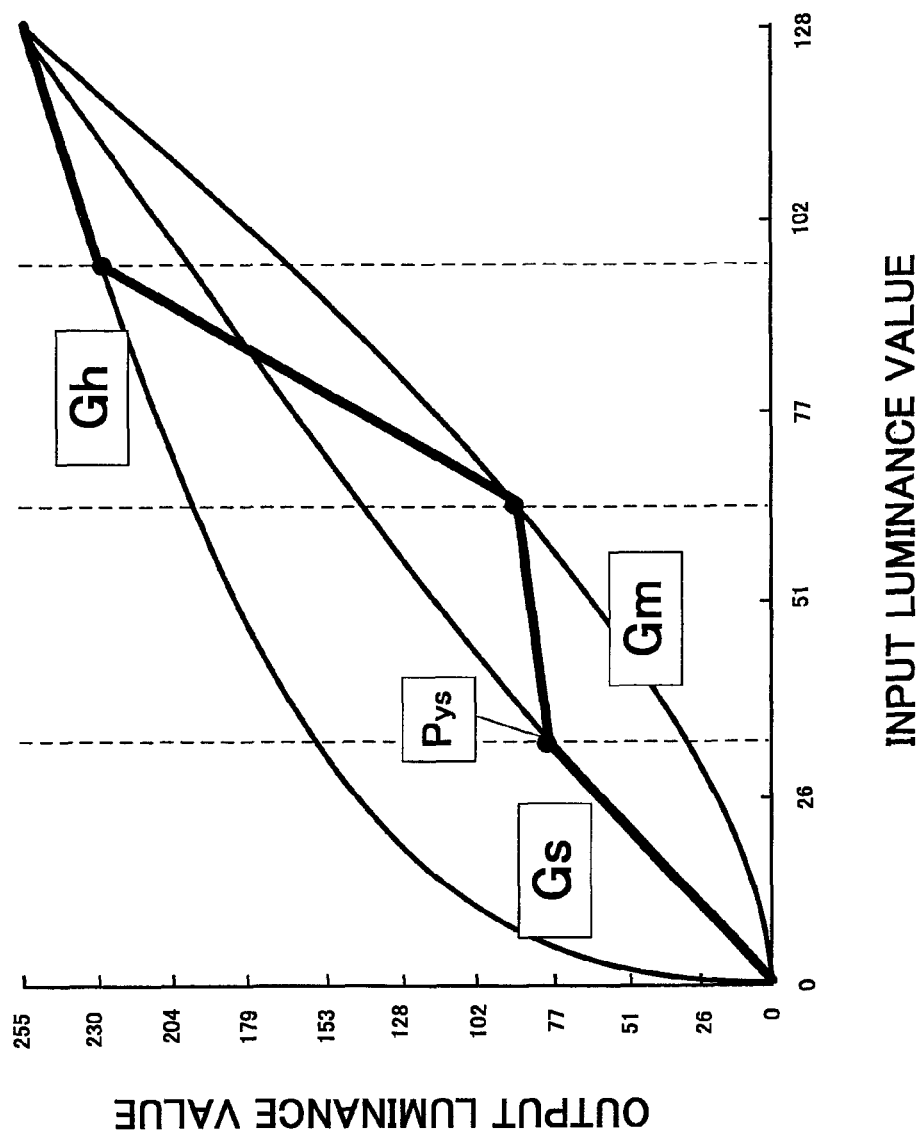
FIG. 9 shows a diagram representing one example of a gamma correction function in each class of the local cumulative histogram of FIG. 6.
Figure 10:
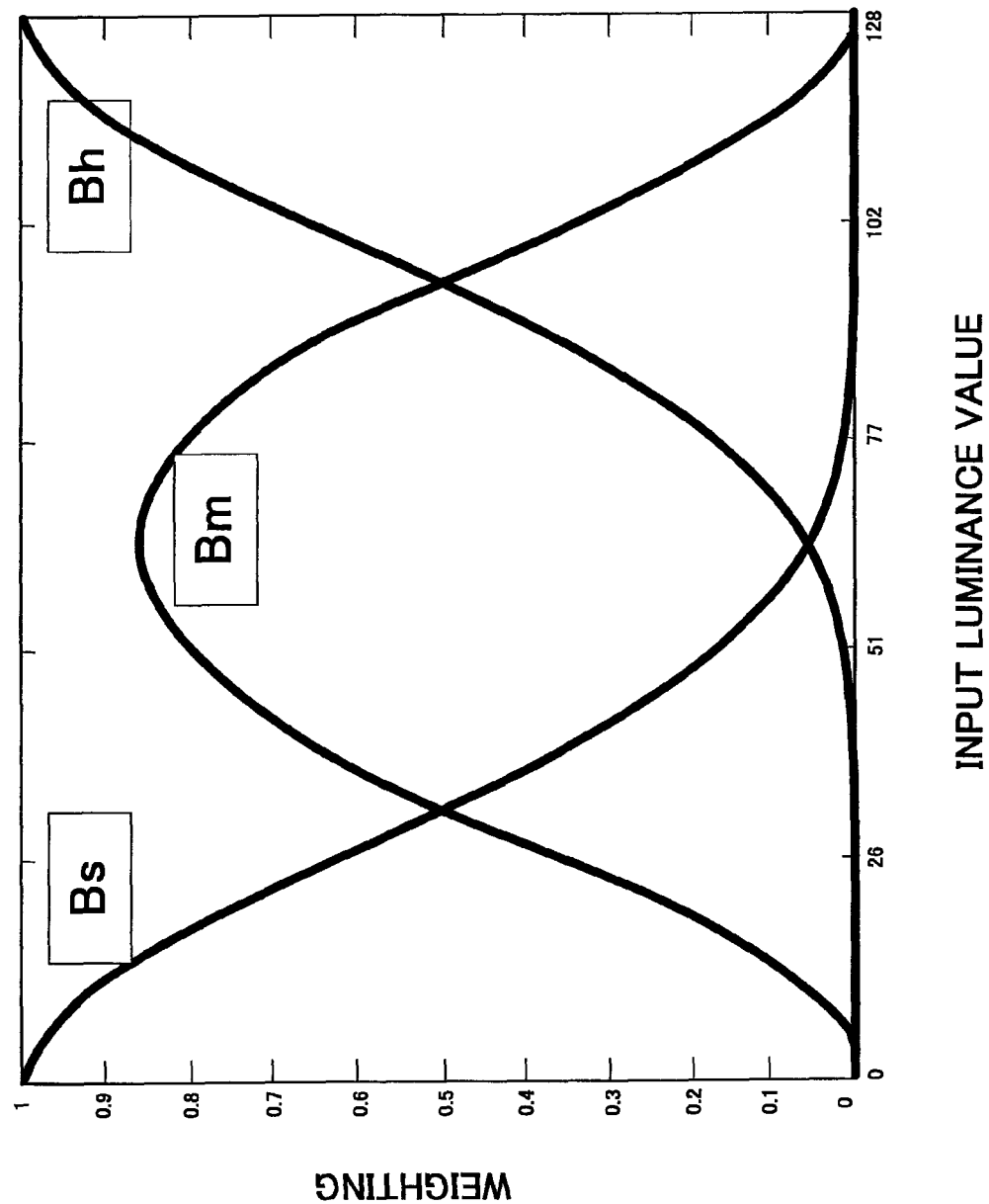
FIG. 10 shows a diagram representing one example of a weighting function with respect to the gamma correction function shown in FIG. 9.
Figure 11:
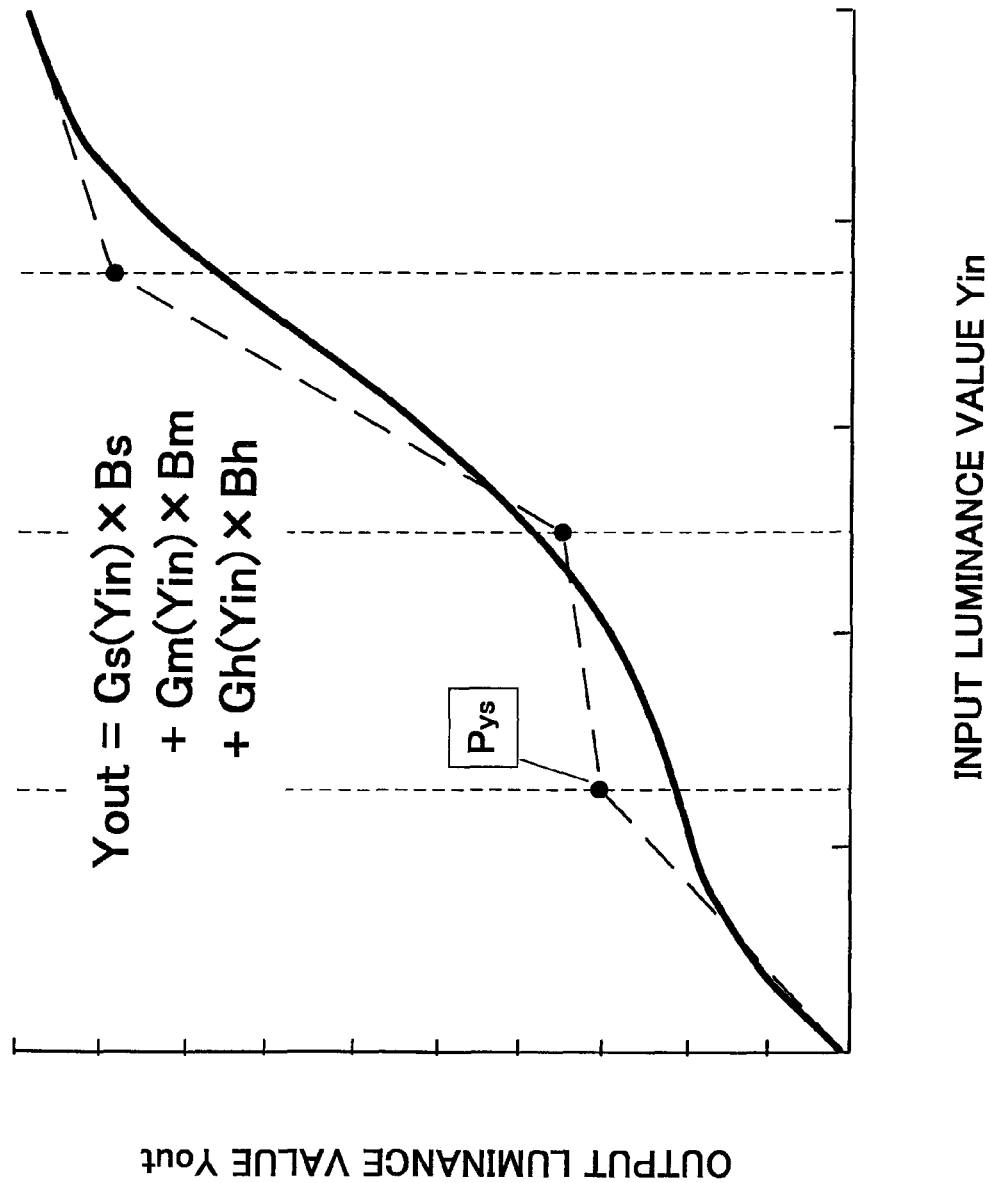
FIG. 11 shows a diagram representing one example of a luminance conversion function produced by the gamma correction function of FIG. 9 and the weighting function of FIG. 10.
Figure 12:
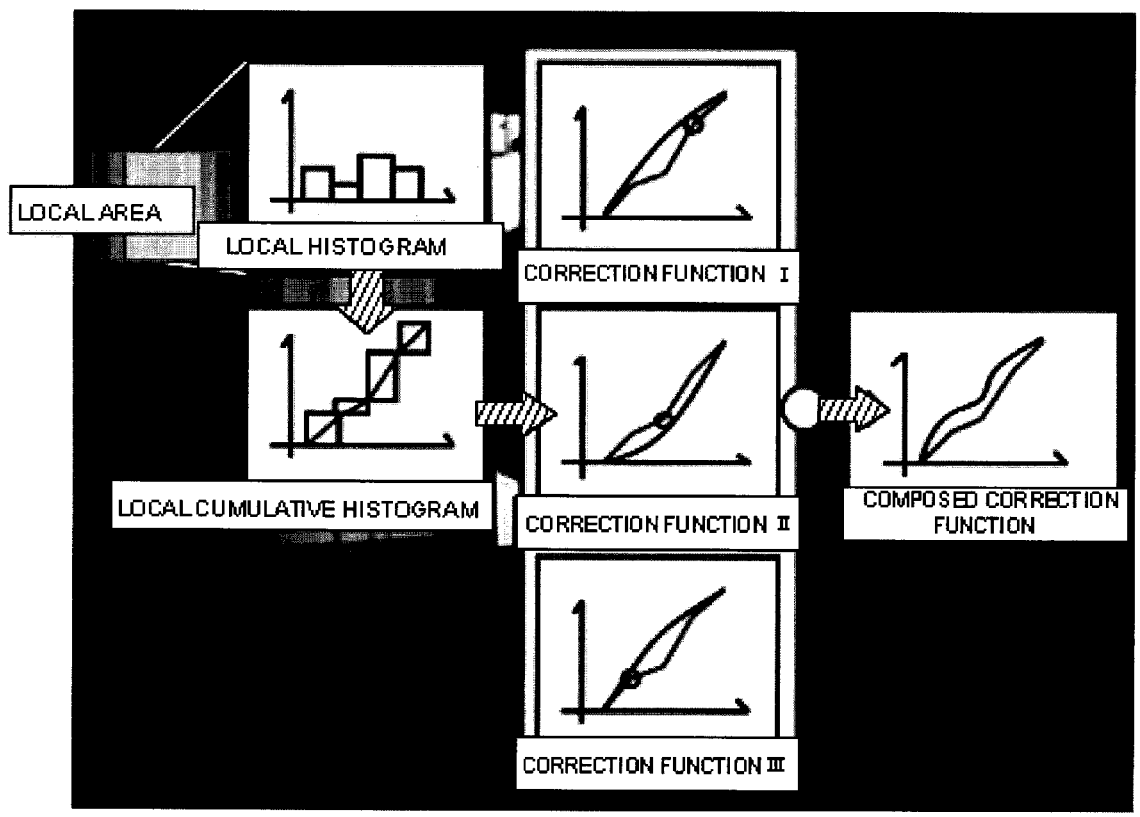
FIG. 12 is a is a pattern diagram showing a state of producing the luminance conversion function of FIG. 11.

FIG. 5 is a flowchart representing an example of the operation or function of the image processing apparatus 1. FIG. 6A is a pattern diagram showing one example of an original image to be image-processed by the image processing apparatus shown in FIG. 1, and FIG. 6B is a pattern diagram showing one example of an image after performing the image processing of the original image. FIG. 7A is a pattern diagram showing one example of a local area in which a certain pixel of which luminance will be converted is positioned at a center of the area in the original image. FIG. 7B is a diagram showing one example of a local histogram in the local area. FIG. 8 is a diagram showing one example of a local cumulative histogram with respect to the local histogram. FIG. 9 shows a diagram representing one example of a gamma correction function in each class of the local cumulative histogram. FIG. 10 shows a diagram representing one example of a weighting function with respect to the gamma correction function. FIG. 11 shows a diagram representing one example of a luminance conversion function produced by the gamma correction function and the weighting function. FIG. 12 is a pattern diagram showing a state of producing the luminance conversion function.

First, referring to FIG. 5, the image processing apparatus 1 is subjected to inputting of the original image (step S1). More specifically, the CPU 2 of the image processing apparatus 1 obtains the original image 30 to be image-processed as shown in FIG. 6A and stores the obtained original image 30 to the frame memory. Here, as shown in FIG. 6A, the original image is an example showing a case of "black crush" in which an image becomes dark by backlight and is not clearly observed or a case of "white fly" in which the image becomes brightly not to be clearly visual, which results in deviation of luminance of the original image.

As mentioned above, the image processing apparatus 1 functions as one example of an original image inputting means adopted to receive the input of the original image to be image-processed.

Then, the image processing apparatus sets a pixel to be processed from the original image (step S2). Specifically, the CPU 2 give an image processing command to the image processing unit 3, and as shown in FIG. 7A, the image processing unit 3 sets the pixel 31 as an object to be processed (which may be objective pixel hereunder) from the original image 30. More specifically, the X-directional scanning with respect to the original image as an object to be image-processed reaches the end in the X-direction, the scanning is performed in the Y-direction subsequently one by one pixel to thereby set the pixel 31 to be processed and the original image is digitally processed subsequently by every pixel.

Next, the image processing apparatus 1 sets the local area with the objective pixel being the center (step S3). Specifically, the image processing unit 3 of the image processing apparatus 1 sets, as shown in FIG. 7A, the local area (33×33 pixel) with the objective pixel 31 as a pixel to be converted in brightness being the center. Here, when the Box-Filtering system is utilized, by setting the tap number, the local area is determined. As shown in FIG. 2, by inputting the pixel data of two portions by scanning one by one (one pixel by one pixel) of the objective pixel 31, the local area requiring the local histogram is deemed to be also moved.

Thus, the image processing apparatus 1 functions as one example of local area setting means for setting the local area with the pixel performing the brightness conversion being the center from the original image.

Next, the image processing apparatus 1 calculates the local histogram of which class is rough (step S4). Specifically, as shown in FIG. 7A, the image processing unit 3 obtains the local histogram (axis of ordinate: pixel number; axis of abscissa: class based on luminance) as the local area 32 being statistical information as shown in FIG. 7B, in which the class of the abscissa axis is obtained at rough accuracy, for example, with four classes of 8 bit accuracy: 0-63, 64-127, 128-191, and 192-255, with respect to the luminance. As shown in FIG. 2, the class of the local histogram is determined by a portion of the pixel determination of the distributor 7 of the image processing unit 3.

The histogram counts the number of the pixels within the specific luminance range, so that the same result will be obtained even by dividing a window area into optional sizes and then counting the numbers. In supposition of one of the divided windows, a case in which the local area 32 moves in the Y-direction by one pixel will be considered. Supposition of the histogram of the window area before the movement is made such as h_SUMy1 (x, y−1) and the histogram thereof after the movement is made such as h_SUMy1(x, y). Herein, processing result by the first-order addition processor 10 is exemplarily shown.

The histogram is a processing of counting the numbers of the pixels in the specific luminance area, and accordingly, as shown in FIG. 32, in a case where the luminance of the pixel data f(x+16, y+16) is in the range of 192-255 and the luminance of the pixel data f(x+16, y−17) is in the range of 128-191, the sums of the pixel numbers in the luminance range 128-191 included in the h128_SUMy1(x, y) and the pixel numbers in the luminance range 192-255 included in the h192_SUMy1 (x, y) are shown as the following Equation 5.

[Equation 5]

$$h128\_SUMy(x,y)=h128\_SUMy(x,y-1)-1$$

$$h192\_SUMy(x,y)=h192\_SUMy(x,y-1)+1 \quad (5)$$

In the entire histogram, the following Equation 6 will be shown.

[Equation 6]

$$h\_SUMy(x+16,y)=h\_SUMy(x+16,y-1)-\lambda(x+16,y-17)+\lambda(x+16,y+16) \quad (6)$$

wherein λ(x, y) is the number of pixels in which the luminance of the pixel of the coordinate (x, y) belongs in the luminance range of the histogram and is always "1". As mentioned, the histogram always performs "+1" or "−1" count-out processing, so that combination of the circuits shown in FIG. 2 is enabled.

Further, in a case where the histogram of the local area 32 shown in FIG. 7A is required to be obtained, the X-directional first-order addition processor 20 is performed as shown in FIG. 2 with respect to the processed result by the Y-directional first-order addition processor 10. The image processing unit 3 calculates the histogram of the local area 32 while scanning the local area 32 in the X-direction.

As mentioned above, the image processing apparatus 1 functions as one local histogram calculation means calculating the local histogram relating to the brightness in the local area.

Next, the image processing apparatus 1 calculates the local cumulative histogram (step S5). Specifically, the image processing unit 3 accumulates the local histogram such as shown in FIG. 7, and as shown in FIG. 8, calculates the local cumulative histogram in the local area 32. With reference to FIG. 8, the local cumulative histogram represents a broken-line-shaped function, and apexes of the respective broken lines of the local cumulative histogram shows apex Pys in the dark portion and apex Pyh in the bright portion. Here, the local cumulative histogram is a local cumulative histogram corresponding to the local histogram having four classes, for example, as shown in FIG. 8, and outputs the output luminance with respect to the input luminance so as to deal with the image correction function correcting the contrast and the like. However, in this condition, since the class in the axis of abscissa is rough, a smooth conversion function is produced from the local cumulative histogram through a succeeding processing.

Such image processing apparatus 1 functions as one example of local cumulative histogram calculation means that calculates the local cumulative histogram by accumulating the local histogram.

Next, the image processing apparatus 1 determines the gamma correction function per bin (step S6). Specifically, the image processing unit 3 decides the gamma correction function as one example of a monotone increasing function corresponding to the cumulative frequency value in the bin of each class. More specifically, as shown in FIG. 9, the image processing apparatus 1 determines the same numbers as those of the apexes of the gamma correction function Gs, Gm and Gh as one example of the versatile image correction function passing portions near the respective apexes Pys, Pym and Pyh of the cumulative histogram (FIG. 9). Herein, the monotone increasing function includes, in a narrow sense, f(x)>f(y) in case of (x>y), and includes, in a broad case, f(x)≧f(y) in case of (x≧y).

As mentioned above, the image processing apparatus 1 functions as one example of the monotone increasing function determining means that respectively determines the first and second monotone increasing functions corresponding to the cumulative frequency values in the first and second classes of the local cumulative histogram.

Next, the image processing apparatus 1 produces a conversion function by composing the respective correction functions based on the weighting function (step S7). Specifically, first, the image processing unit 3 determines, as shown in FIG. 10, the respective weighting functions corresponding to the respective monotone increasing functions. More specifically, the image processing unit 3 determines the weighting functions Bs, Bm and Bh designated by every class and having Gauss distribution. These weighting functions have local maximal values at the respective classes. In the class of the dark portion, the Gauss distribution function Bs becomes local maximal value at the input luminance value of 0 (zero), in the class of the intermediate portion at the input luminance value, the Gauss distribution function Bm becomes local maximum at the input luminance value being intermediate, and in the class of the bright portion, the Gauss distribution function Bh becomes local maximum at the maximum value of the input luminance value. Thus, the image processing apparatus 1 functions as one example of a weighting function determining means that determines the first and second weighting functions with respect to the first and second monotone increasing functions, respectively.

Furthermore, the image processing apparatus 1 also functions as one example of weighting determining means that determines the first weighting function having the local maximal value in the first class and the local maximal value in the second class.

The thus set plural gamma correction functions are composed by the weighting functions Bs, Bm and Bh designated every class to thereby produce the conversion function concerning the brightness of the pixel. More specifically, the image processing unit 3 weights the respective gamma correction functions of the dark portion, the intermediate portion and the bright portion by the weighting functions of the dark portion, intermediate portion and bright portion, respectively, which are then added to thereby produce the conversion function of the pixel brightness. The broken-line shaped image correction functions having rough accuracy (local cumulative histogram) constitute an image correction function of a continuous approximate curve, and smooth image correction with respect to the luminance change becomes enabled.

As mentioned above, the image processing apparatus 1 functions as one example of conversion function producing means that produces a conversion function representing the brightness of the pixel from the first monotone increasing function weighted by the first weighting function and the second monotone increasing function weighted by the second weighting function. Furthermore, the image processing apparatus 1 also functions as one example of monotone increasing function determining means that determines at least one of the first and second monotone increasing functions to the gamma correction function. Still furthermore, the image processing apparatus 1 further functions as one example of function producing means that produces a conversion function by adding the first monotone increasing function weighted by the first weighting function and the second monotone increasing function weighted by the second weighting function.

In the next step, the image processing apparatus 1 applies the conversion function to the pixel to be objected (objective pixel) (step S8). Specifically, the image processing unit 3 makes an approximate curve (composed function) continuous to the local cumulative histogram to an image correction function (axis of ordinate: output luminance value Yout; axis of abscissa: input luminance value Yin), and processes the objective pixel as image. Herein, the image correction is performed by the following Equation 7, in which the image correction function is one example of a conversion function representing the brightness of the pixel.

[Equation 7]

$$Yout = Gs(Yin) \times Bs + Gm(Yin) \times Bm + Gh(Yin) \times Bh \quad (7)$$

Then, the the image processing unit 3 stores the output luminance value obtained in relation to the position information of the pixel to be objected (objective pixel). As mentioned above, the image processing apparatus 1 thus functions as one example of the conversion means that converts the brightness of the pixel by using the conversion function.

In the next step, the image processing apparatus 1 judges whether the next pixel is last one or not (step S9). Specifically, the image processing unit 3 scans the original image and then judges whether the scanning reaches the last pixel or not. In a case of not the last one pixel, (step S9: NO), the image processing unit 3 returns to the step S2 and moves to the next objective pixel. If it is the last pixel (step S9: YES), the image processing unit 3 finishes the operation, and transmits a signal representing the finishing of the image processing to the CPU 2. As shown in FIG. 6B, the original image 30 is image-processed by the image processing apparatus 1, so that a face portion, which was blackened (crushed in black), is made clear and a scenery outside the window, which is whitened (blur in white), is also made clear, thus providing a clear image 40.

As described hereinabove and shown in FIG. 12, the image processing apparatus 1 obtains the local histogram from the local area and thereafter obtains the local cumulative histogram. Thereafter, the image processing apparatus 1 obtains the correction functions I, II and III at the apexes of the respective local cumulative histograms, these correction functions I, II and III then being composed based on the weighting functions and then produces a composed correction function as one example of the conversion function.

According to the present embodiment, it becomes possible to receive the input of the original image which is subjected to the image processing, to set a local area with the pixel of which brightness is converted being the center, to calculate the local histogram in relation to the brightness of the local area, to calculate the local cumulative histogram by accumulating the local histograms, to respectively determine the first and second monotone increasing functions corresponding to the cumulative frequency values in the first and second classes of the local cumulative histograms, to respectively determine the first and second weighting functions corresponding to the first and second monotone increasing functions, to produce a conversion function representing the brightness of the pixel from the first monotone increasing function weighted by the first weighting function and the second monotone increasing function weighted by the second weighting function, and to convert the brightness of the pixel by the conversion function.

Accordingly, even if the class of the histogram be made rough to reduce calculation amount, the conversion function corresponding to the local cumulative histogram can be obtained by the first and second monotone increasing functions weighted by the weighting functions, thus providing the image processing apparatus, the image processing method and the image processing program capable of converting the brightness of the respective pixels appropriately at high speed. In addition, the image processing apparatus 1 can perform the modification or correction of luminance offset and can improve the contrast between the local areas.

Herein, the image processing in the local area includes volume of calculation and increases in the calculation time even if the class of the local histogram is set with fine accuracy (for example: 0, 1, 2, - - - 254, 255). On the other hand, if the class is set with rough accuracy, the calculation time is shortened but non-continuous broken-line-shaped image correction function will be provided. That is, although the output luminance value with respect to the input luminance value is not so varied, the output luminance value will be rapidly varied with a certain input luminance value, thus providing unnatural image.

Furthermore, in the case where the class of the local histogram is set with fine accuracy, it is necessary to classify the classes into respective classes of reference pixel groups belonging in the local areas and hold the numbers of such pixels at the time of gaining the histograms. Moreover, it is also necessary to calculate the local cumulative histograms directly related to the image correction functions by the numbers corresponding to the class numbers.

However, the image processing apparatus 1 according to the present embodiment can obtain the conversion function of smooth pixels (for example, smooth approximate curve near the cumulative histogram) even by using a statistical information such as local area histogram measured at rough performance, thus performing appropriate image correction. More specifically, according to the present embodiment of the image processing apparatus, the correction of the luminance offset and improvement of the contrast between the local areas with respect to the deviation in luminance such as "blackened portion" as dark invisible portion by a backlight, for example, or "whitened portion" as brightening portion in the local areas, can be achieved, and unnaturalness of the image can be solved.

Furthermore, in a case where the images are concentrated at a specific certain luminance, when the cumulative histogram of the histograms having fine classes is used, sharp variation is observed at a specific luminance portion and luminance correction causing excessive emphasis may be required. For example, luminance range of a portion such as sky, cloud, or white wall which has less luminance change is widened, resulting in causing of the unnaturalness of an image, and it becomes difficult to properly adjust the image correction. Moreover, the number of the apexes of the local cumulative histograms increase, which results in the difficulty of control and adjustment of the shape of the conversion function corresponding to the local cumulative histogram.

However, the image processing apparatus 1 can independently set the monotone increasing function with respect to each class of the local histograms of the classes having rough accuracy. That is, the proper image correction can be achieved, so that the parameter adjustment by every luminance class can be easily done. Then, the image processing apparatus 1 composes the thus set monotone increasing functions by using the weighting function, and accordingly, the smooth conversion function can be composed and produced as in the case of the histogram having fine classes.

Further, for the calculation of the local histogram, by using a pixel access system similar to the Box Filtering technology shown in FIGS. 2 to 4, the local histogram not depending on the size of the local area can be obtained. Furthermore, in the case of using this pixel access system, it is necessary to hold the local histogram information corresponding to one row, and for the histogram having fine classes, more increased memory area is needed, but by making rough the classes, the memory area may be reduced.

Further, as shown in FIG. 2, the image processing unit 3 can calculate the local histogram with respect to the original image at high speed with less memory size by the arrangement, in accordance with the pixel data of the original image, including the distributor 7 distributing the pixel data, the Y-directional first-order addition processor 10 and the X-directional first-order addition processor 20, and moreover, the image processing unit 3 can carry out the processings at high speed not depending on the local size requiring the local histogram. Still furthermore, by applying the second- and third-order addition processing, a circuit for producing the weighting local histogram can be realized. Herein, in the case of the second-order addition processing, the Y-directional first-order addition processors 10 are arranged side by side, the outputs from the respective addition processors 10 are connected to one Y-directional first-order addition processor 10, and thereafter, the X-directional first-order addition processor 20 is connected by two stages.

Next, a first modified example of the present embodiment will be explained with reference to the drawings. This modified embodiment is an example in which a straight line is used as a gamma correction function as the monotone increasing function.

Figure 13:
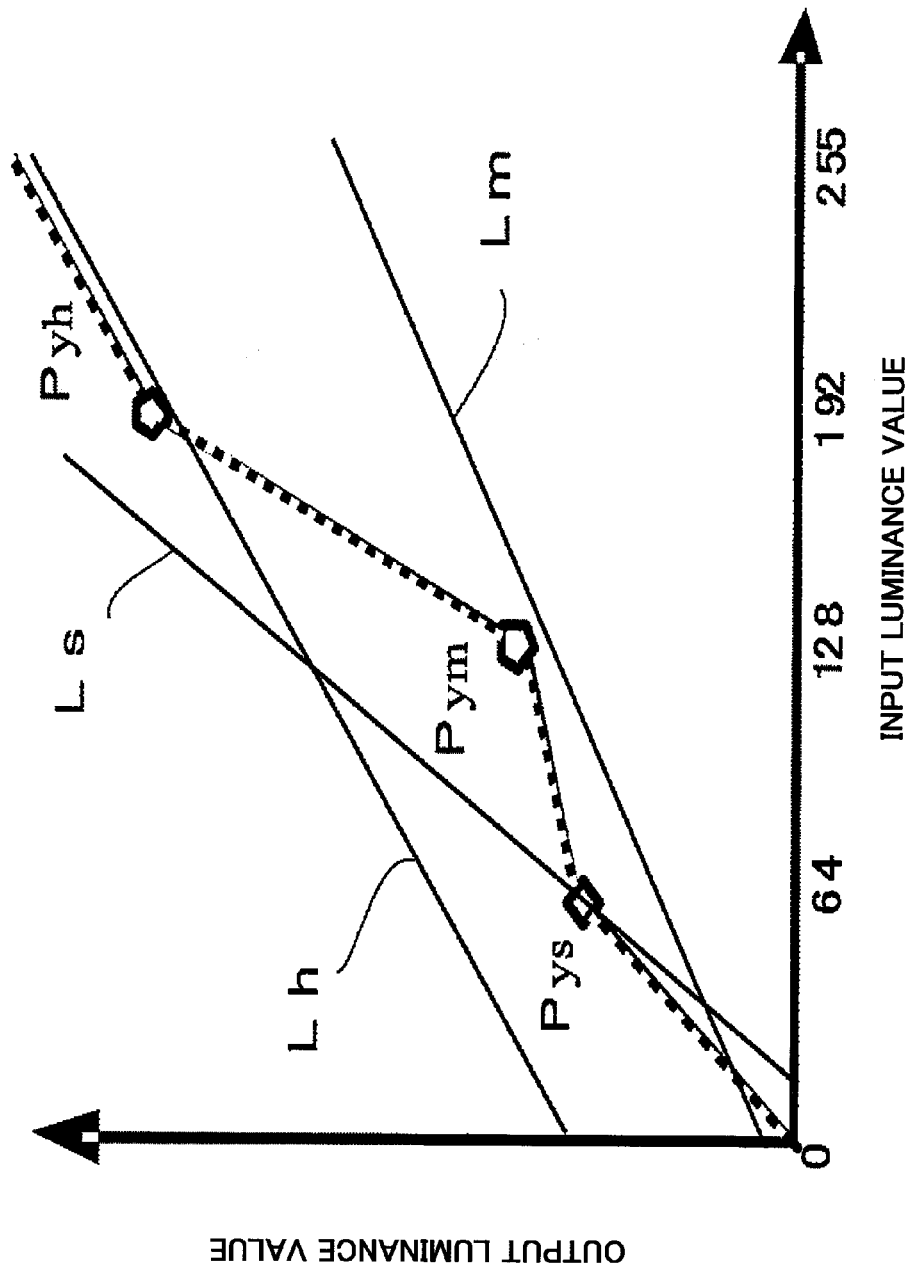
FIG. 13 shows a diagram representing a first modified example of a monotone increasing function.

FIG. 13 is a diagram representing a first modified example of the monotone increasing function.

As shown in FIG. 13, the image processing unit 3 of the image processing apparatus 1 determines straight lines (linear functions) Ls, Lm and Lh corresponding to the cumulative frequency values at the respective apexes Pys, Pym and Pyh of the local cumulative histograms. The image processing unit 3 can set independently the straight lines Ls, Lm and Lh at the respective apexes Pys, Pym and Pyh of the local cumulative histograms.

In the case shown in FIG. 13, the movement in the ordinate axis (output luminance value) corresponds to the offset of the brightness, and the inclination of the line corresponds to the contrast. As shown in FIG. 13, it is not always necessary for the respective straight lines Ls, Lm and Lh to pass the corresponding apexes Pys, Pym and Pyh, and the offset values can be adjusted by moving the respective straight lines Ls, Lm and Lh in the ordinate axis (output luminance value) direction in the respective classes.

As mentioned above, the image processing apparatus 1 functions as one example of the monotone increasing addition function determining means that determines at least one of the first and second monotone increasing functions as a linear function. In such case, the offset value in brightness and the contrast may be easily instinctively set.

Next, a second modified example of the present embodiment will be explained with reference to the drawings. This modified embodiment is an example in which a sigmoid function is used in place of the gamma function as the monotone increasing function in the intermediate class.

Figure 14A:
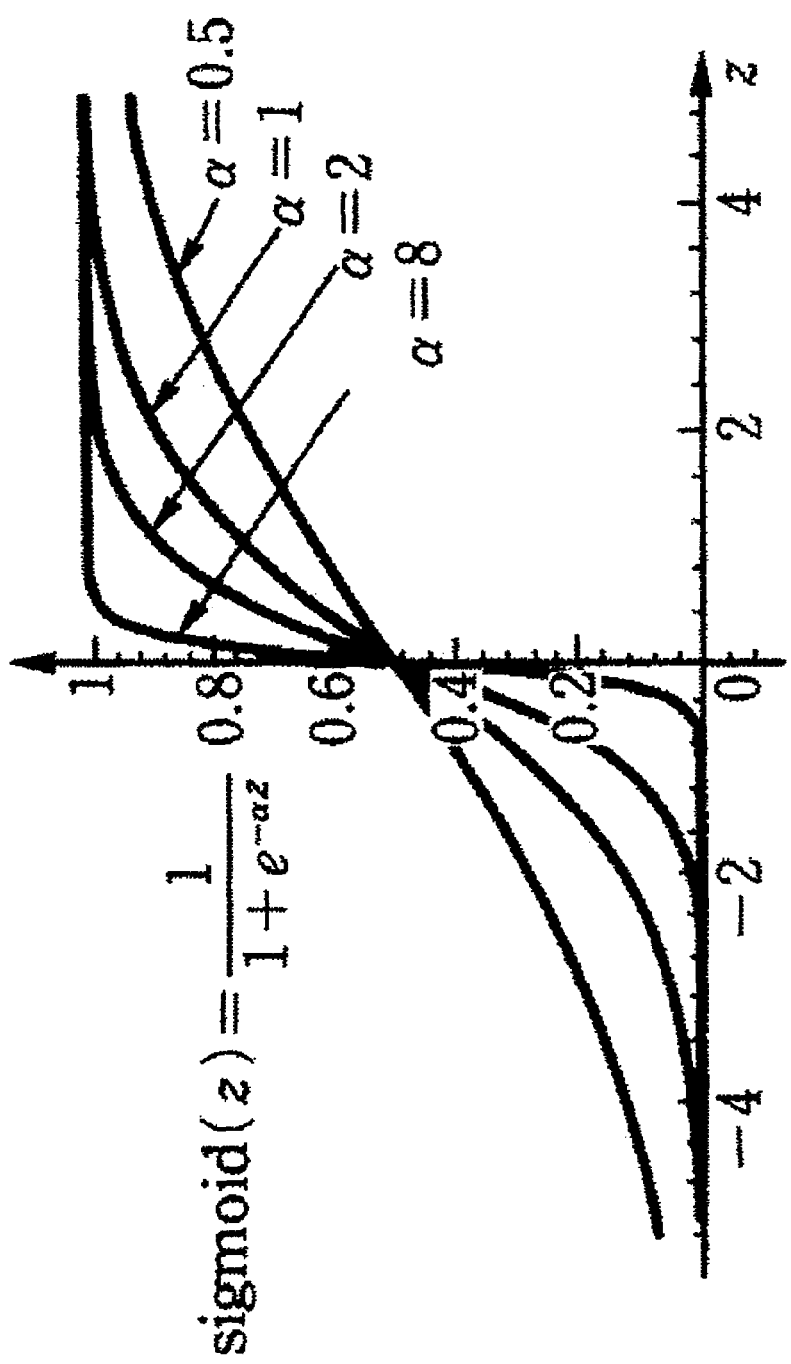
FIG. 14A shows a diagram of a second modified example of the monotone increasing function.
Figure 14B:
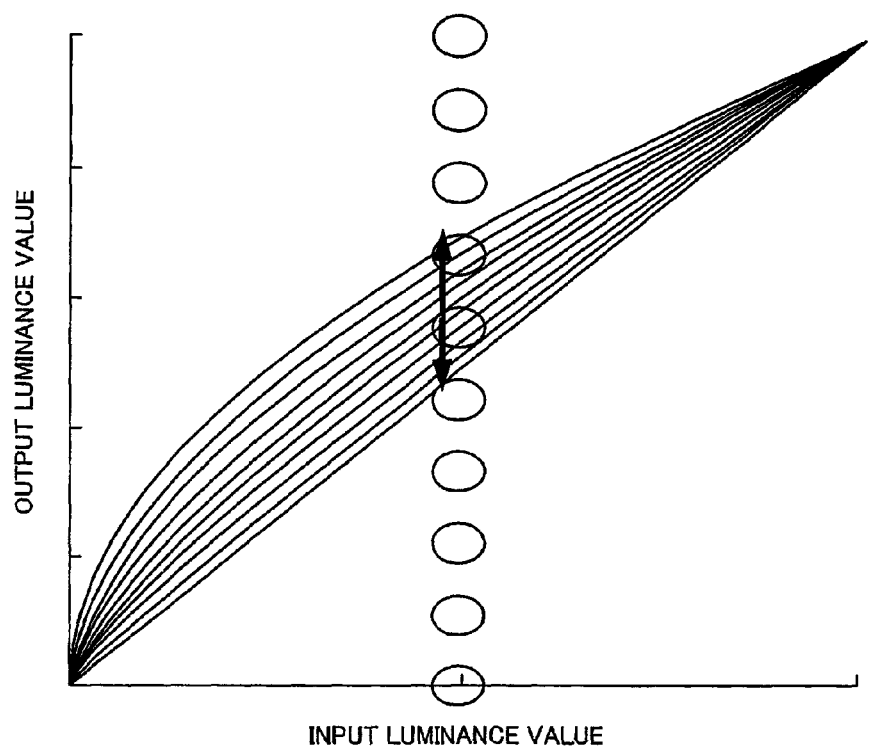
FIG. 14B shows a pattern diagram showing a range of apex of the gamma correction function in a class in an intermediate section.

FIG. 13A is a diagram representing a second modified example of the monotone increasing function, and FIG. 14B is a pattern diagram showing a range of the apex of the gamma function in the intermediate class.

As shown in FIG. 14A, the image processing apparatus 1 allots the sigmoid function as a function different from the gamma correction function at the intermediate portion of the input luminance value.

In a case where the specific luminance areas are concentrated at the intermediate luminance, when the gamma function is utilized for the correction to the intermediate luminance portions, as shown in FIG. 14B, the adjustment of the luminance offset in the local area, that is, the adjustment of increasing or decreasing in the luminance value, is mainly performed. On the other hand, as shown in FIG. 14B, when the sigmoid function is utilized for the intermediate luminance portion, the adjustment of the contrast, that is, the correction for sharpening or softening the luminance change, will be performed. Thus, according to the characteristics of the image, by using the different functions, the contrast adjustment can be done, and the contrast in the intermediate luminance in the local area can be further improved.

Herein, the sigmoid function formula is as follows.

$$Y\text{out}=1/(1+\exp(-aY\text{in})) \qquad (8)$$

Further, with respect to 8 bit image, the following formula will be provided.

$$Y\text{out}=255/(1+\exp(-aX(-1+(Y\text{in}/128))) \qquad (9)$$

In this modified example, a straight line of monotone increasing may be used in place of the sigmoid function.

Next, a modified example of the weighting function in the present embodiment will be explained with reference to the drawing.

Figure 15:
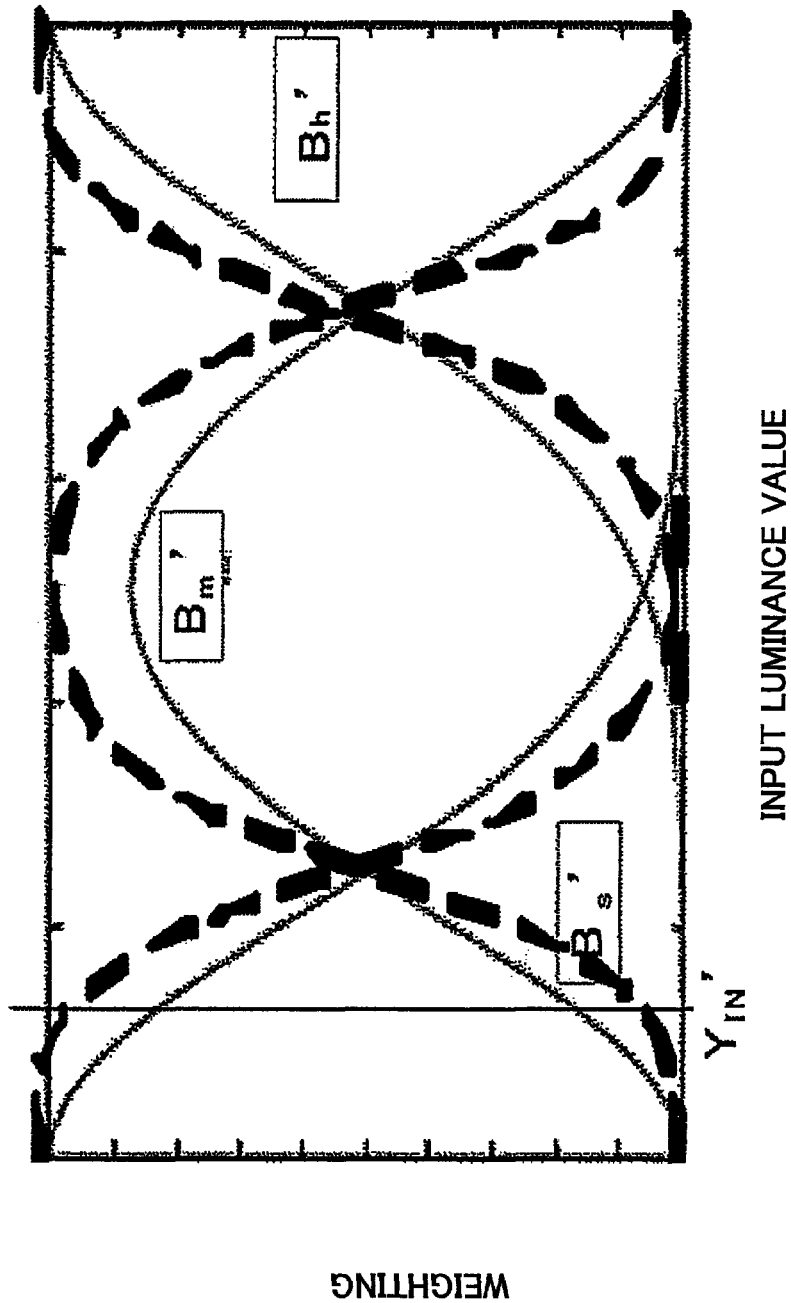
FIG. 15 shows a diagram representing a modified example of the weighting function.

FIG. 15 is a diagram representing a modified example of the weighting function.

As shown in FIG. 15, when the input luminance value is Yin', Bs:Bm=80:20, but when weight Bs', Bm' and Bh' for composition shown with dotted lines are used, Bs':Bm'=5:95. As mentioned, by varying the shape of the weighting function, combination degree of each monotone increasing function of every luminance can be varied.

As mentioned above, the image processing apparatus 1 functions as one example of the weighting function determining means varying overlapping ratio of the first and second weighting functions. In such case, by controlling the overlapping ratio of the respective weighting functions, the monotone increasing functions are independently controlled, the combined degree of the respective monotone increasing functions of every luminance is varied, and the conversion function is produced. When the monotone increasing functions of which classes are adjacent to each other are connected to thereby produce the conversion function, the connecting condition will be changed by changing the shape of the weighting function, and by changing the combined degree of the respective monotone increasing functions, more suitable conversion function will be produced.

Second Embodiment

An image processing apparatus according to a second embodiment of the present invention will be described hereunder.

Schematic structure of the image processing apparatus according to the second embodiment is substantially the same as that of the first embodiment. It is further to be noted that like reference numerals are added to members or portions corresponding to those mentioned with reference to the first embodiment, and only different structures and functions will be explained hereunder. This matter is also applicable to other embodiments and modifications, which will be mentioned hereinafter.

Operations and/or functions of the second embodiment of the image processing apparatus 1 will be explained hereunder with reference to FIGS. 16 to 23. Further, in this second embodiment, steps or processes corresponding to the steps S5 and S6 of the first embodiment are different.

Figure 16:
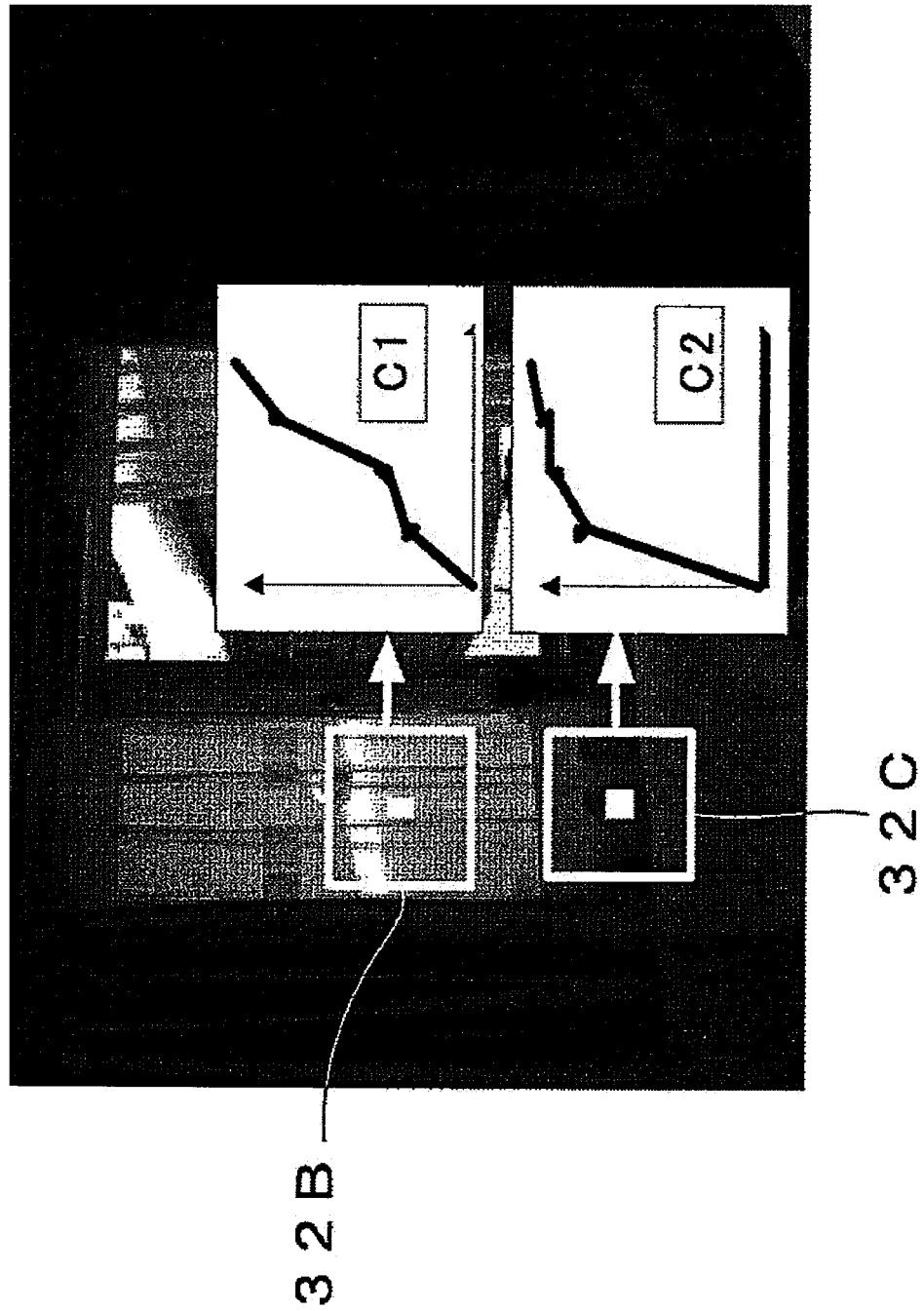
FIG. 16 shows a pattern diagram of one example of a local cumulative function in a different local area for explaining principle of a second embodiment according to the present invention.
Figure 17:
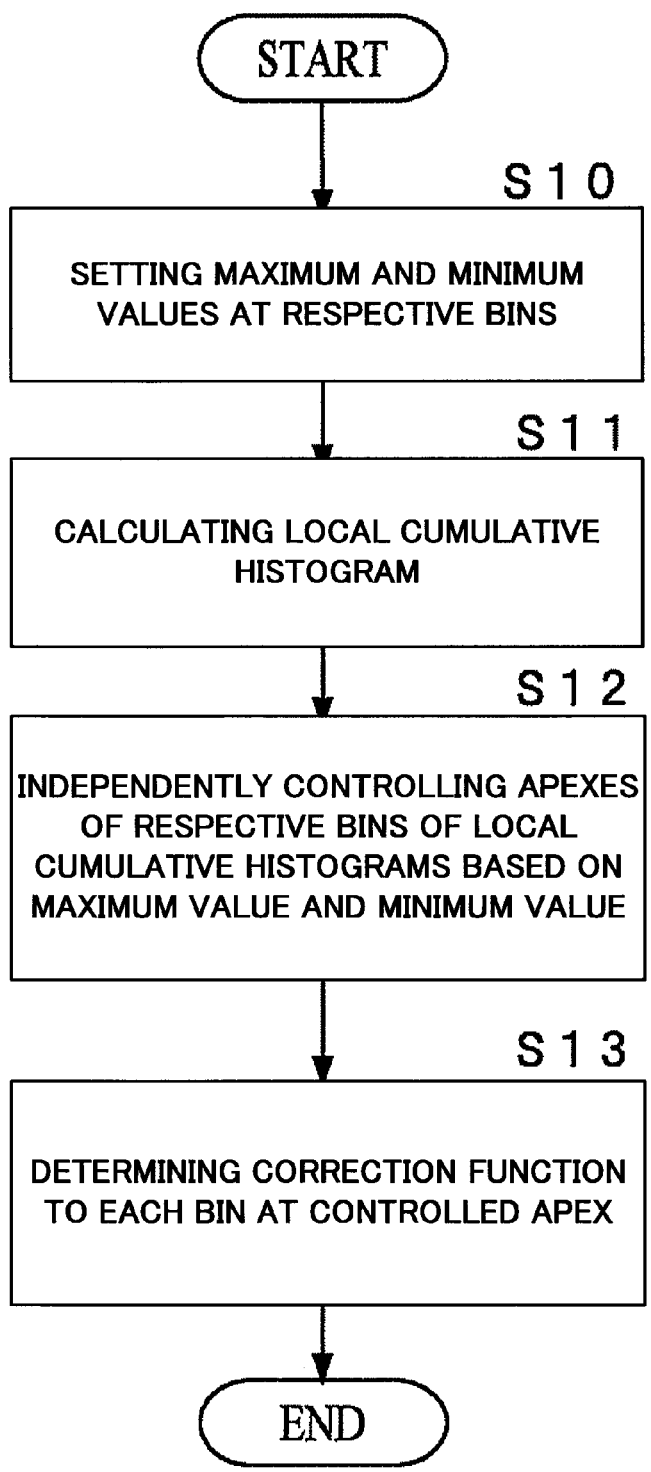
FIG. 17 is a flowchart representing an operation example of an image processing apparatus according to the second embodiment of the present invention.
Figure 18:
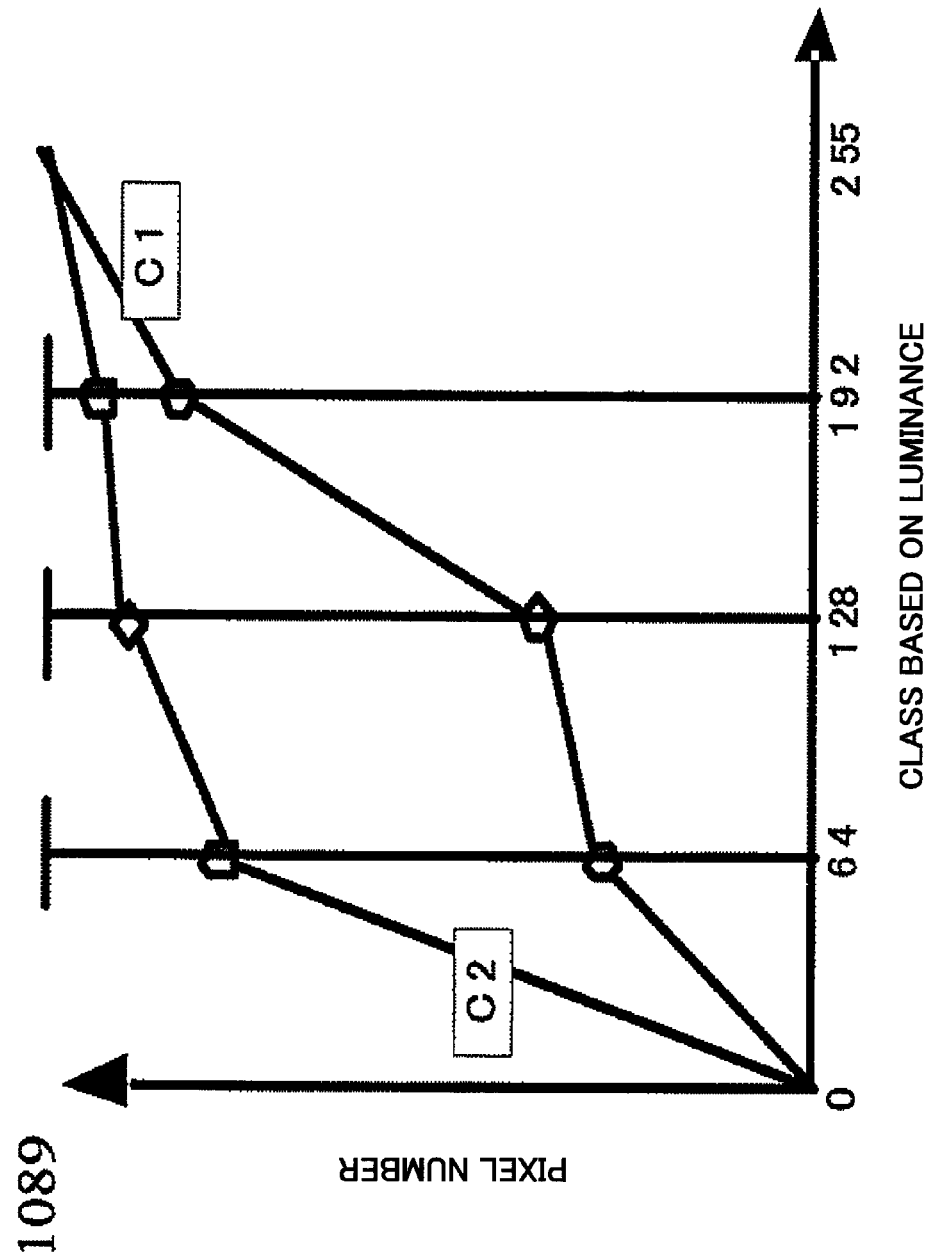
FIG. 18 shows a diagram representing one example of a range to be taken by a cumulative frequency value of a local cumulative histogram.
Figure 19:
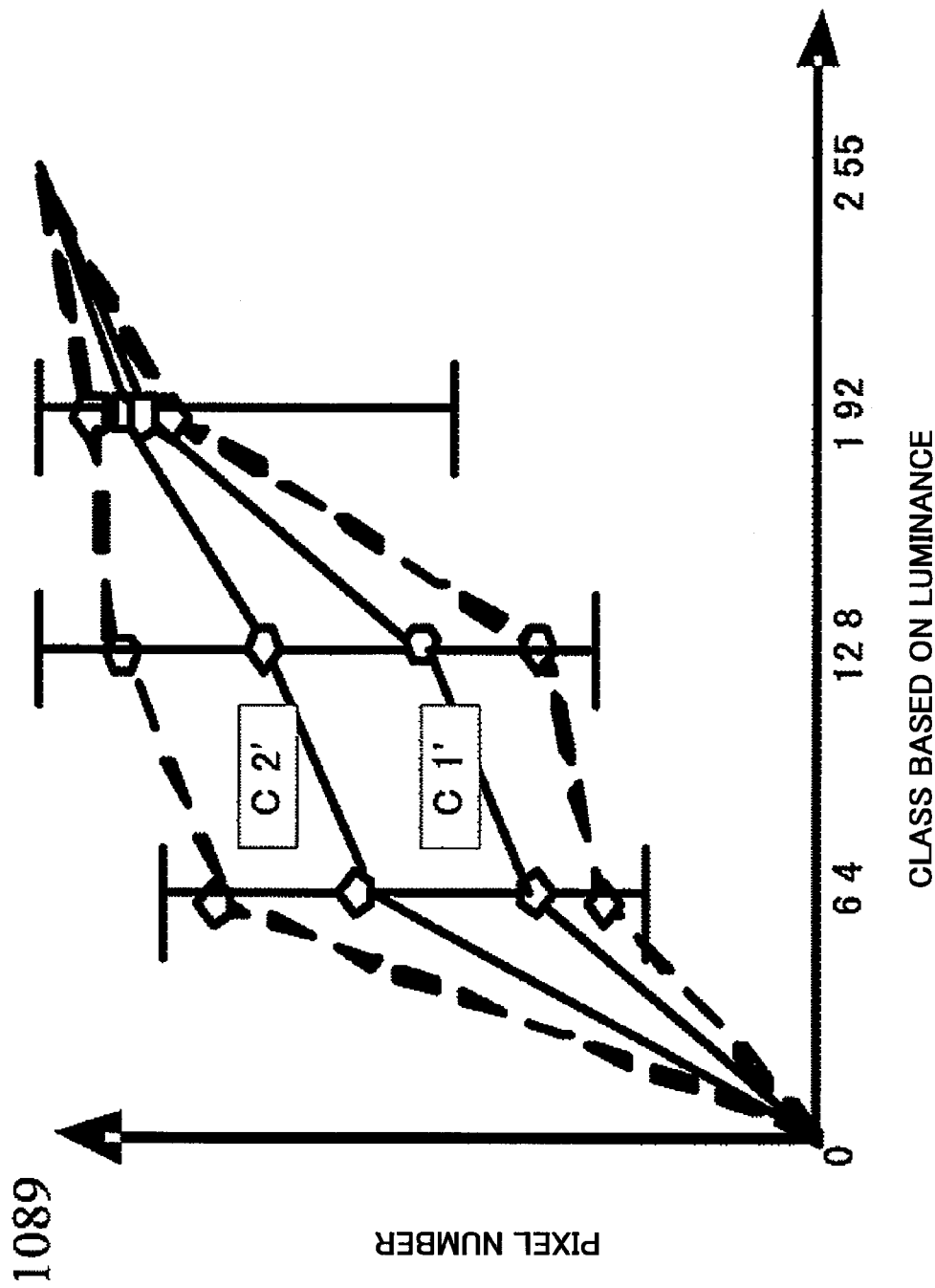
FIG. 19 shows a diagram indicting controlling in a range to be taken by the cumulative frequency value of the local cumulative histogram.
Figure 20:
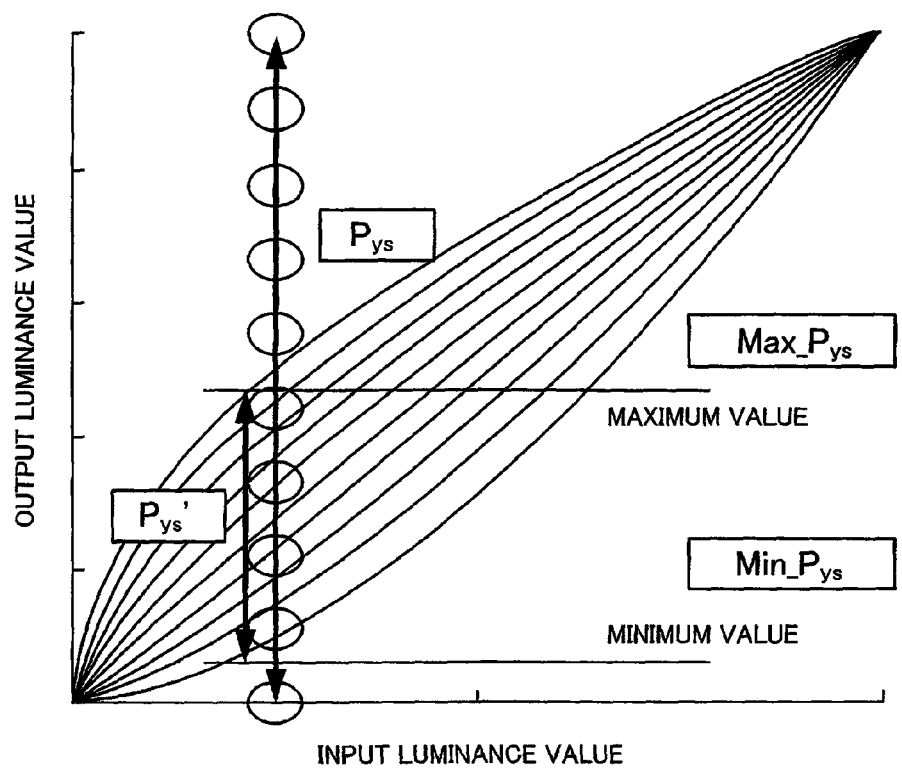
FIG. 20 shows a diagram representing a gamma correction function in an input luminance value corresponding to a class of a dark section.
Figure 21:
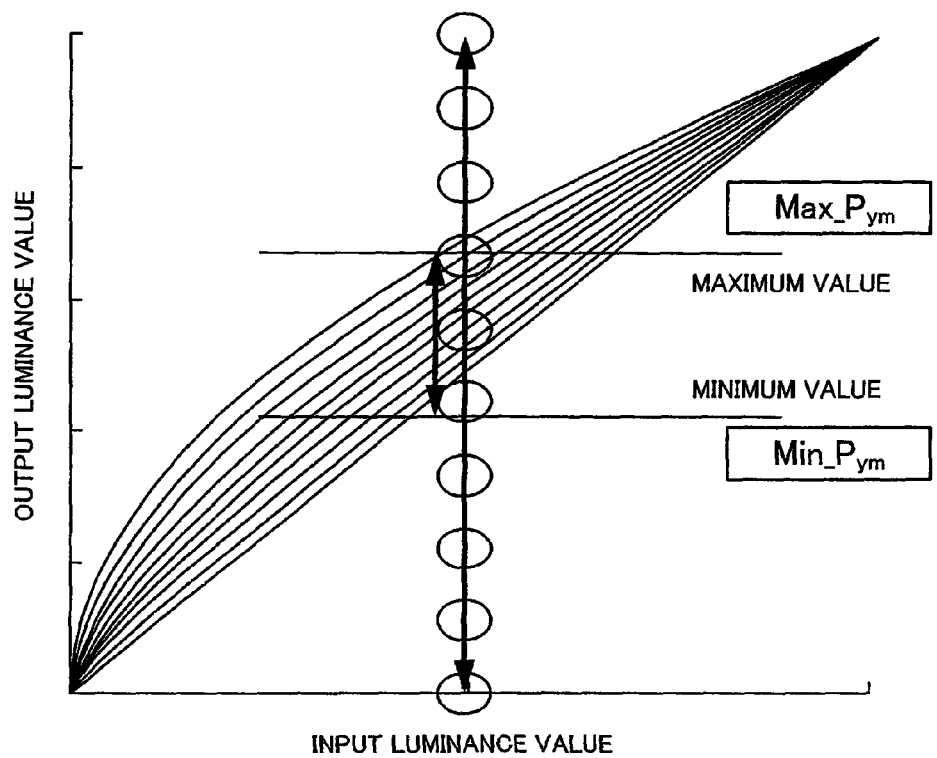
FIG. 21 shows a diagram representing a gamma correction function in an input luminance value corresponding to a class of an intermediate section.
Figure 22:
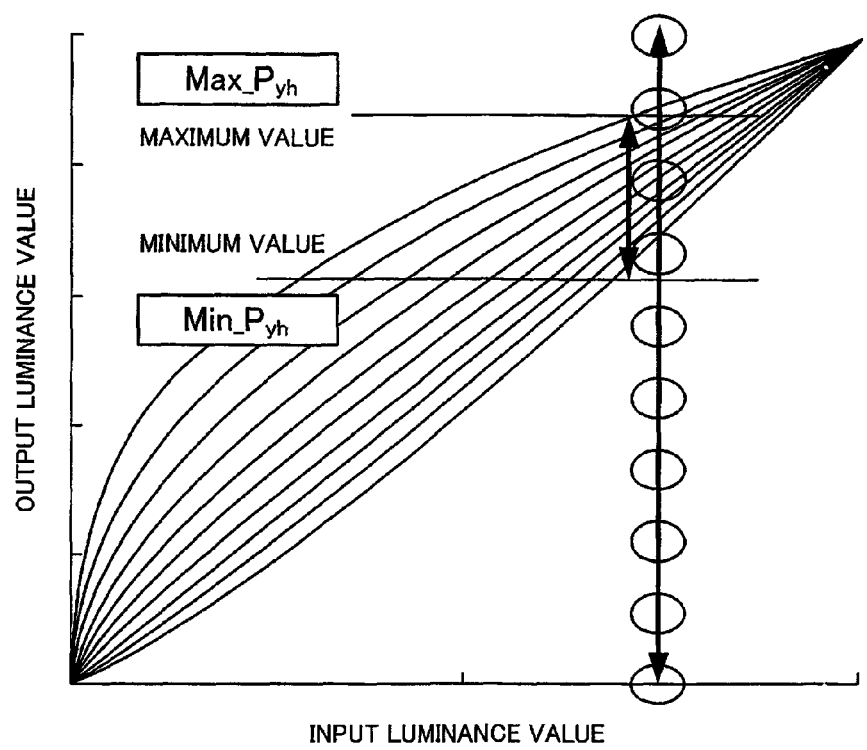
FIG. 22 shows a diagram representing a gamma correction function in an input luminance value corresponding to a class of a bright section.
Figure 23:
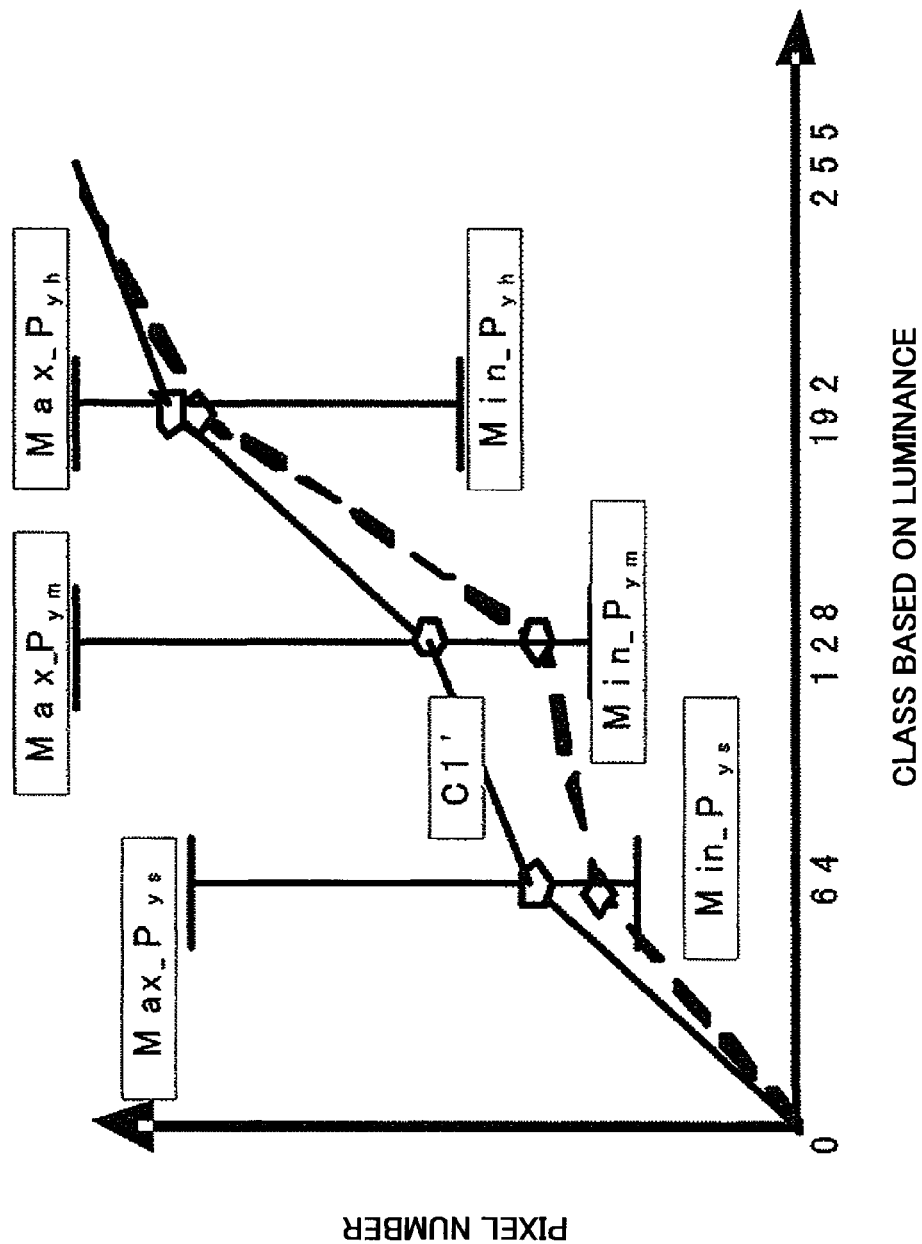
FIG. 23 shows a diagram representing a local cumulative histogram of which offset of the luminance is adjusted.
Figure 24:
FIG. 24 shows a pattern diagram representing one example of an original image before the luminance conversion.

FIG. 16 is a pattern diagram showing one example of a local cumulative histogram in different local areas. FIG. 17 is a flowchart representing an example of operations of the image processing apparatus according to the second embodiment of the present invention. FIG. 18 shows a diagram representing one example of a range to be taken by a cumulative frequency value of a local cumulative histogram. FIG. 19 shows a diagram indicting controlling in a range to be taken by the cumulative frequency value of the local cumulative histogram. FIG. 20 shows a diagram representing a gamma correction function in an input luminance value corresponding to a class of a dark section. FIG. 21 shows a diagram representing a gamma correction function in an input luminance value corresponding to a class of an intermediate section. FIG. 22 shows a diagram representing a gamma correction function in an input luminance value corresponding to a class of a bright section. FIG. 23 shows a diagram representing a local cumulative histogram of which offset of the luminance is adjusted;

First, as shown in FIG. 16, shapes of histograms of local areas 32B and 32C of the image are different, and in accordance therewith, shapes of local cumulative histograms are also different. Respective apexes of the local histograms C1 and C2 are also different in local areas. In the present embodiment, consideration is made to control a range of values which are taken by the respective apexes Psy, Pym and Pyh of different local cumulative histograms with respect to the local areas 32B and 32C, respectively.

As shown in FIG. 17, after the extraction of the local area in the step D3 in the first embodiment, the image processing apparatus 1 sets the maximum and minimum values at the respective bins (step S10). Specifically, as shown in FIG. 18, the image processing unit 3 of the image processing apparatus 1 sets upper and lower limit parameter values (maximum value and minimum value) to the apexes of the local cumulative histograms to control the conversion luminance range. Herein, the parameter values are set to ranges (minimum value: 0, maximum value: pixel numbers in local area) capable of being taken by the respective apexes Pys, Pym and Pyh of the local cumulative histograms as one example of the cumulative frequency value in the class of the local cumulative histogram. Based on the thus set minimum value and maximum value, in the subsequent treatment, as the shape control of the cumulative histogram, in the present embodiment, the range thereof (from the minimum value Min_Py(s, m, h) to the maximum value Max_Py(s, m, h) is controlled (compresses), and according to such operation, the cumulative frequency value in the class of the local cumulative histogram can be adjusted or controlled.

In the next step, the image processing apparatus 1 calculates the local cumulative histogram from the local histogram (step S11). Concretely, this step is substantially the same as that of the step S5.

Next, the image processing apparatus 1 independently controls the apexes of the respective bins of the local cumulative histograms based on the maximum value and the minimum value (step S12). More specifically, as shown in FIG. 19, the image processing unit 3 independently controls (compresses) the ranges at the respective apexes Pys, Pym, Pyh.

Next, the image processing apparatus 1 determines a correction function to each bin at the controlled apex (step S13). Specifically, the image processing unit 3 determines the respective gamma correction functions passing near the respective apexes Pys', Pym', Pyh' (Py') with respect to these apexes controlled (compressed) and moved in the former step. More specifically, as shown in FIGS. 20 to 22, the respective gamma correction functions are determined at the controlled respective apexes.

The movement of the apex is performed according to the following equation (10), for example, in the case of the local area (33×33 pixel) and 8 bit image conversion.

$$Py' = 255 \times (\text{Min\_}Py + (\text{Max\_}Py - \text{Min\_}Py) \times Py/255)/1089 \quad (10)$$

As mentioned above, the image processing apparatus 1 functions as one example of the local cumulative histogram adjusting means that adjusts the cumulative frequency value in the class of the local cumulative histogram. Furthermore, the image processing apparatus 1 functions as one example of the local cumulative histogram adjusting means that adjusts the cumulative frequency value by setting the upper and lower limits of the cumulative frequency value in the class of the local cumulative histogram.

According to the present embodiment, by compressing the range, the difference in shapes (in the ordinate axis direction) between the local cumulative histograms C1' and C2' after the compression thereof is made small, and for this reason, the variation in the luminance in a spatial direction after the correction is made loosen, thus suppressing the contrast in the spatial direction.

Furthermore, the ranges capable of being taken by the three apexes of the local cumulative histograms are compressed and the difference between the two local cumulative histograms becomes small. Accordingly, the variation due to the luminance correction of the two local areas becomes small, the spatial luminance variation after the luminance correction is suppressed, and the spatial contrast can be hence suppressed.

Incidentally, as shown in FIG. 23, in the case of the minimum value being not 0 (zero), the minimum value and the maximum value of the luminance at the image correction may be determined by setting the minimum/maximum values (Max_Py{s,m,h},Min_Py{s,m,h}). That is, by controlling the range to be taken by the value of the apex, it becomes possible to set the luminance offset and the spatial contrast by every luminance gradation in the luminance range with the apex being the center.

The image processing apparatus 1 sets the maximum value and the minimum value to be taken by the three apexes of the local cumulative histogram, determines the maximum value and the minimum value of the respective apexes of the local cumulative histogram, and determines the luminance maximum value and the luminance minimum value at the luminance correction of the local area. According to these processings, the luminance offset after the luminance correction varies. That is, the image processing apparatus 1 can control the luminance offset. Further, the luminance maximum value and the luminance minimum value in the luminance correction of the local area can be set by every luminance class.

In the case when the shape of the cumulative histogram is controlled, if the specific apex value is controlled, the cumulative frequency value varies and affects on the other apexes. In the present embodiment, the value to be taken by each apex in the controlling of the range of the cumulative frequency value (apex) in the class of the local cumulative histogram is compressed in that range. Since the monotone increasing function such as the gamma correction function is set to each apex and then composed, it becomes possible to perform the local cumulative histogram adjustment independently in each class.

Further, the respective settings of the minimum value and the maximum value (Min_Py{s,m,h}) and (Max_Py{s,m,h}) by the controlling of the respective apexes are equal to the minimum and maximum luminance settings of the classes of the luminance of the local areas as an object to be processed, and accordingly, by such settings as mentioned above, as shown in FIG. 23, the luminance offset can be adjusted. Furthermore, the ranges of the minimum value and the maximum value are equal to the difference in the spatial correction functions, so that the ranges represent the luminance variation after the correction. Because of this reason, it may be said that the image processing apparatus 1 can control the intensity of the spatial contrast.

Figure 25A:
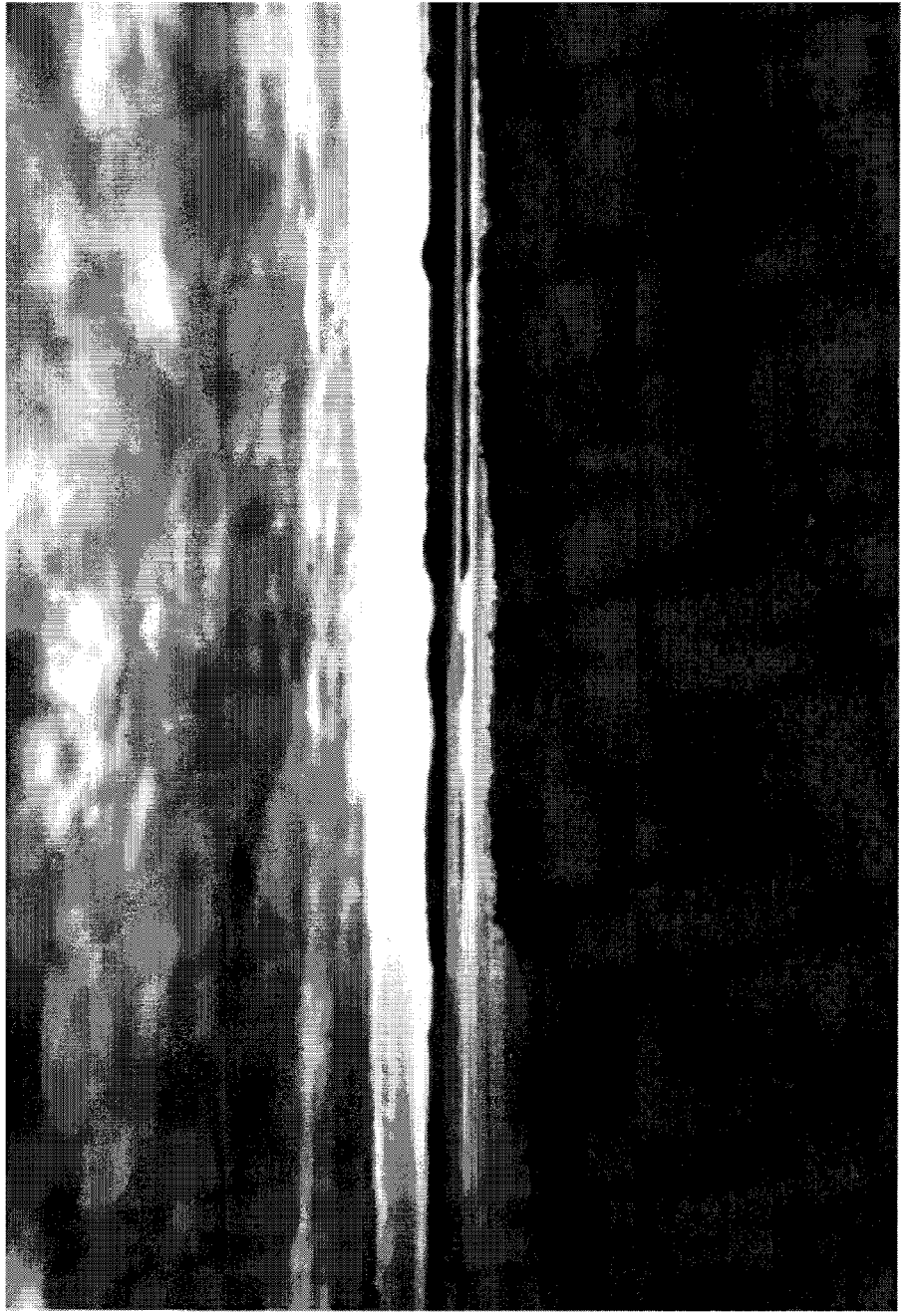
FIG. 25A is a pattern diagram showing one example of an image after the luminance conversion.
Figure 25B:
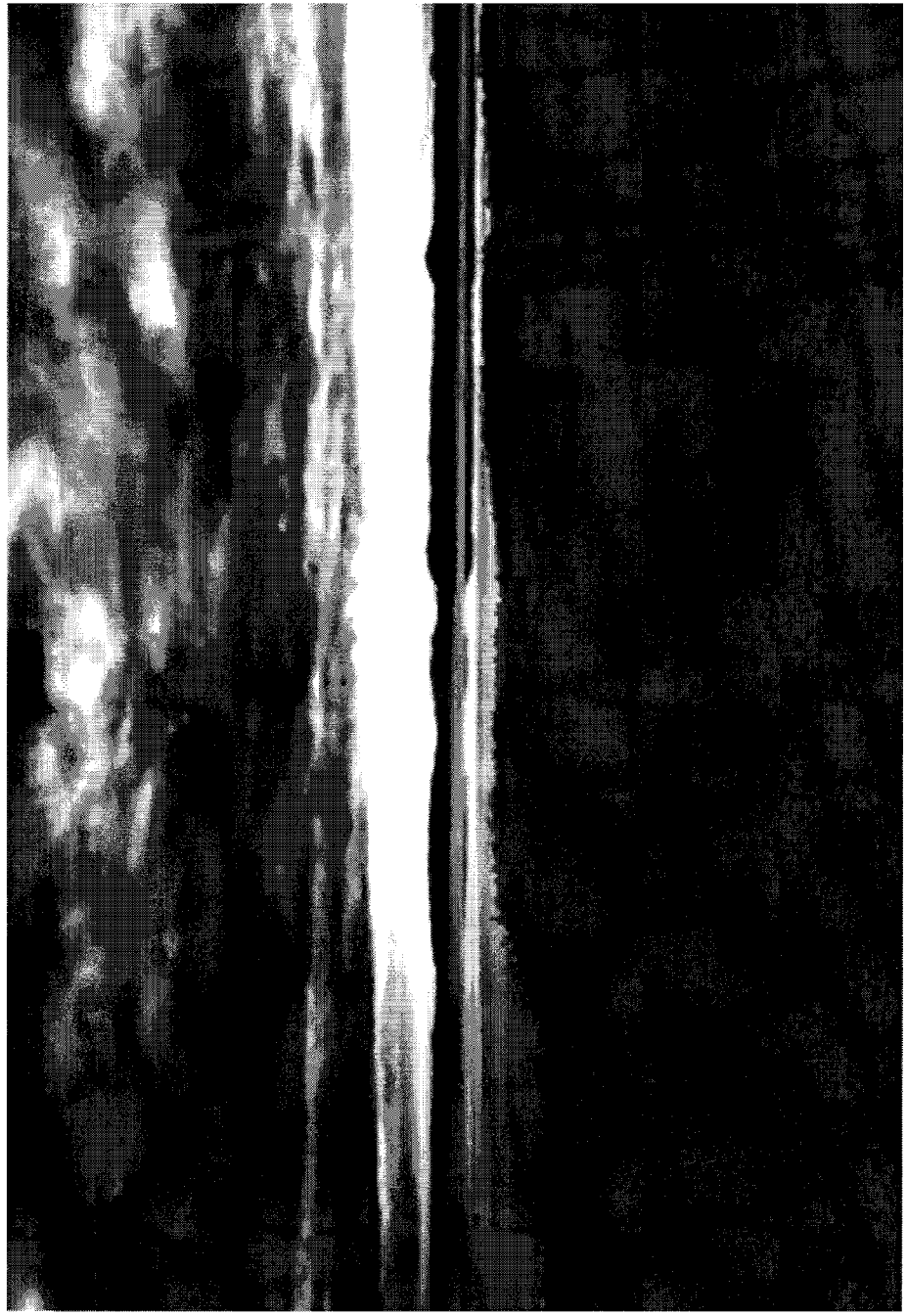
FIG. 25B is a pattern diagram showing another example of an image after the luminance conversion.
Figure 25C:
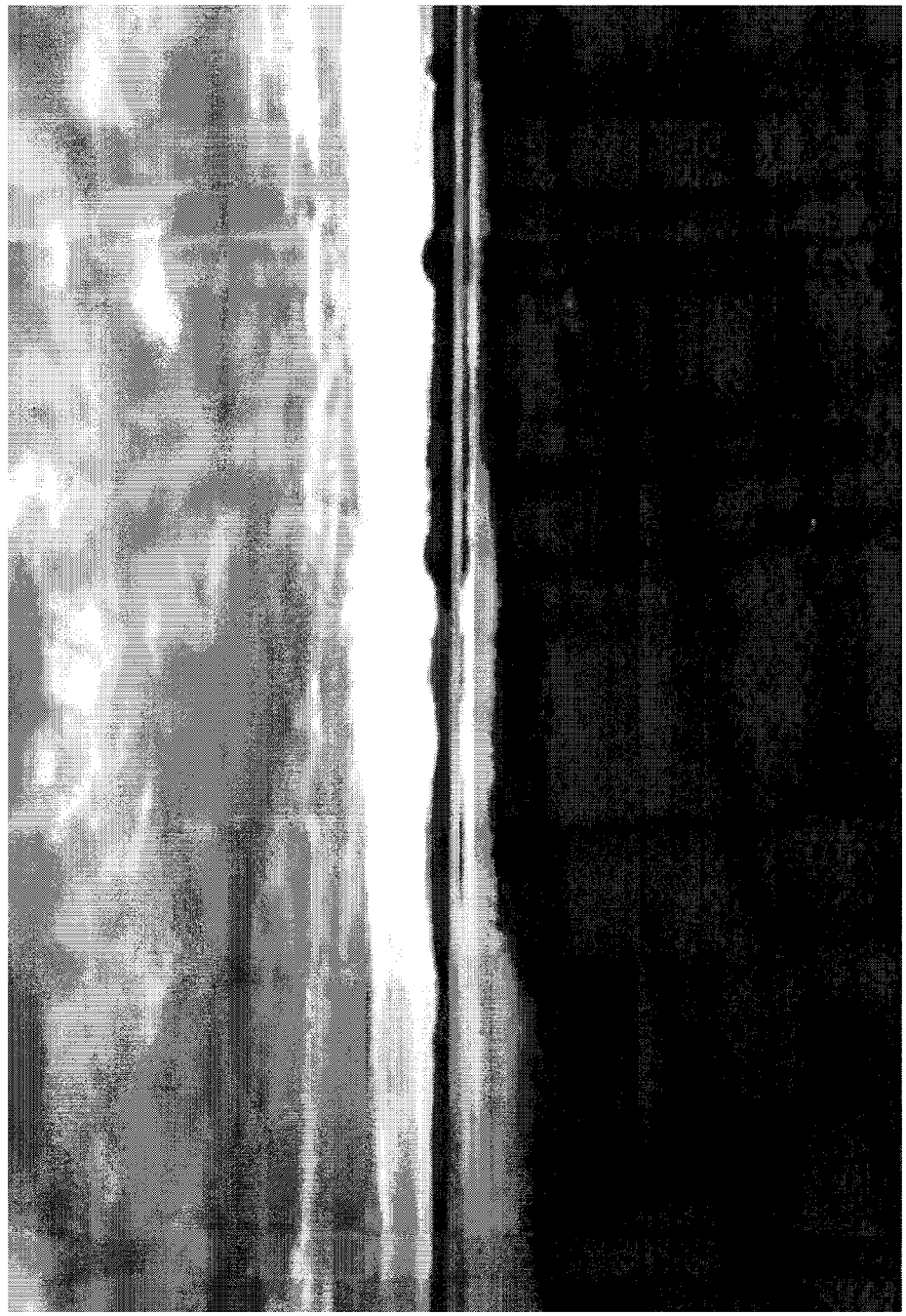
FIG. 25C is a pattern diagram showing a further example of an image after the luminance conversion.

Herein, FIG. 25A represents one example in which the minimum value and the maximum value (Min_Py{s,m,h}) and (Max_Py{s,m,h}) are set and the luminance offset adjustment is thereafter performed. FIG. 25B shows a case in which the spatial contrast between the intermediate portion and the bright portion (contrast between the local areas) is stressed, and for example, the case shows an area in which cloud is imaged is stressed. FIG. 25C shows a case in which a spatial contrast between the intermediate portion and the bright portion is weakened, and for example, is a case in which a contrast in an area in which the cloud is imaged is degraded.

Third Embodiment

Hereunder, an image processing apparatus according to a third embodiment of the present invention will be explained.

FIG. 26 is a block diagram showing the schematic structure of an image processing unit of an image processing apparatus according to a third embodiment of the present invention.

As shown in FIG. 26, the image processing unit 3 of the image processing apparatus 1 includes a global processor 3a and a local processor 3b.

The global processor 3a mainly includes a circuit for processing an image data of a size corresponding to the original image and serves to calculate an entire histogram of the original image (global histogram) and extract gradation area of the original image.

The local processor 3b has substantially identical processing structure as that of the image processing unit 3 of the first embodiment and also performs substantially the same processings.

The operation and function of the image processing apparatus according to this third embodiment will be described hereunder with reference to the accompanying drawings.

Figure 27:
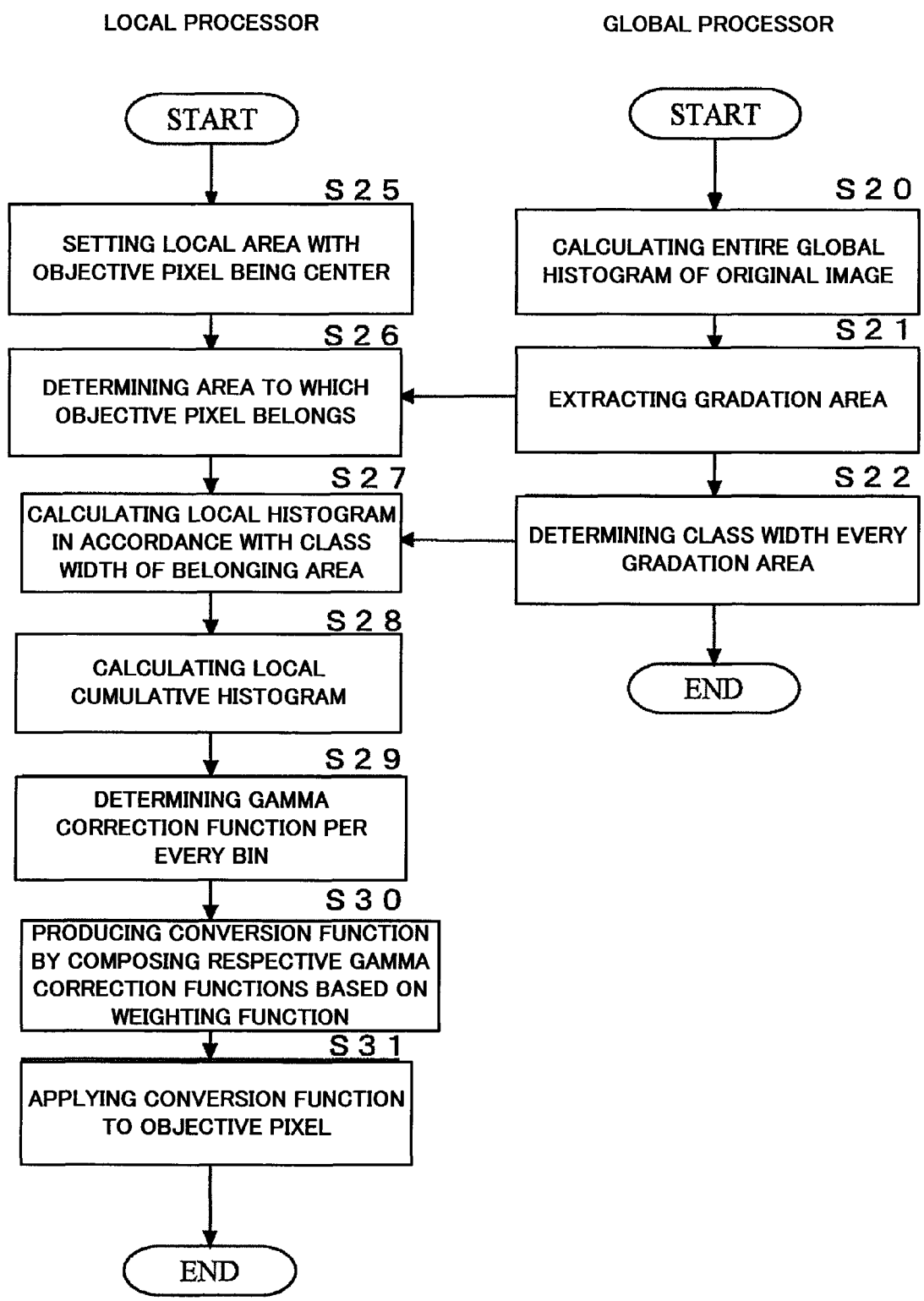
FIG. 27 is a flowchart representing an operation in the image processing unit shown in FIG. 26.
Figure 28A:
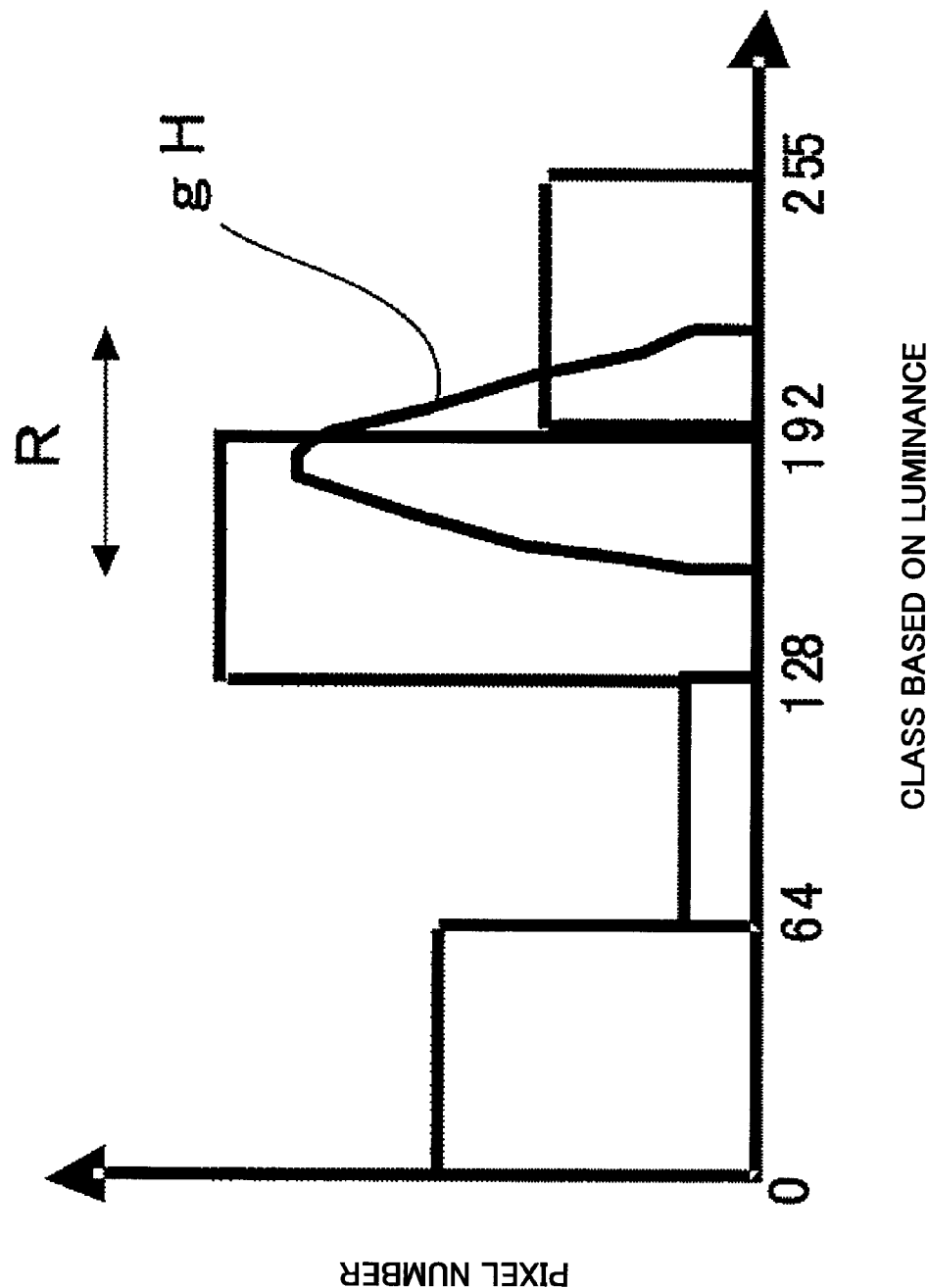
FIG. 28A is a pattern diagram showing one example of a local histogram before alternation of setting of class width.
Figure 28B:
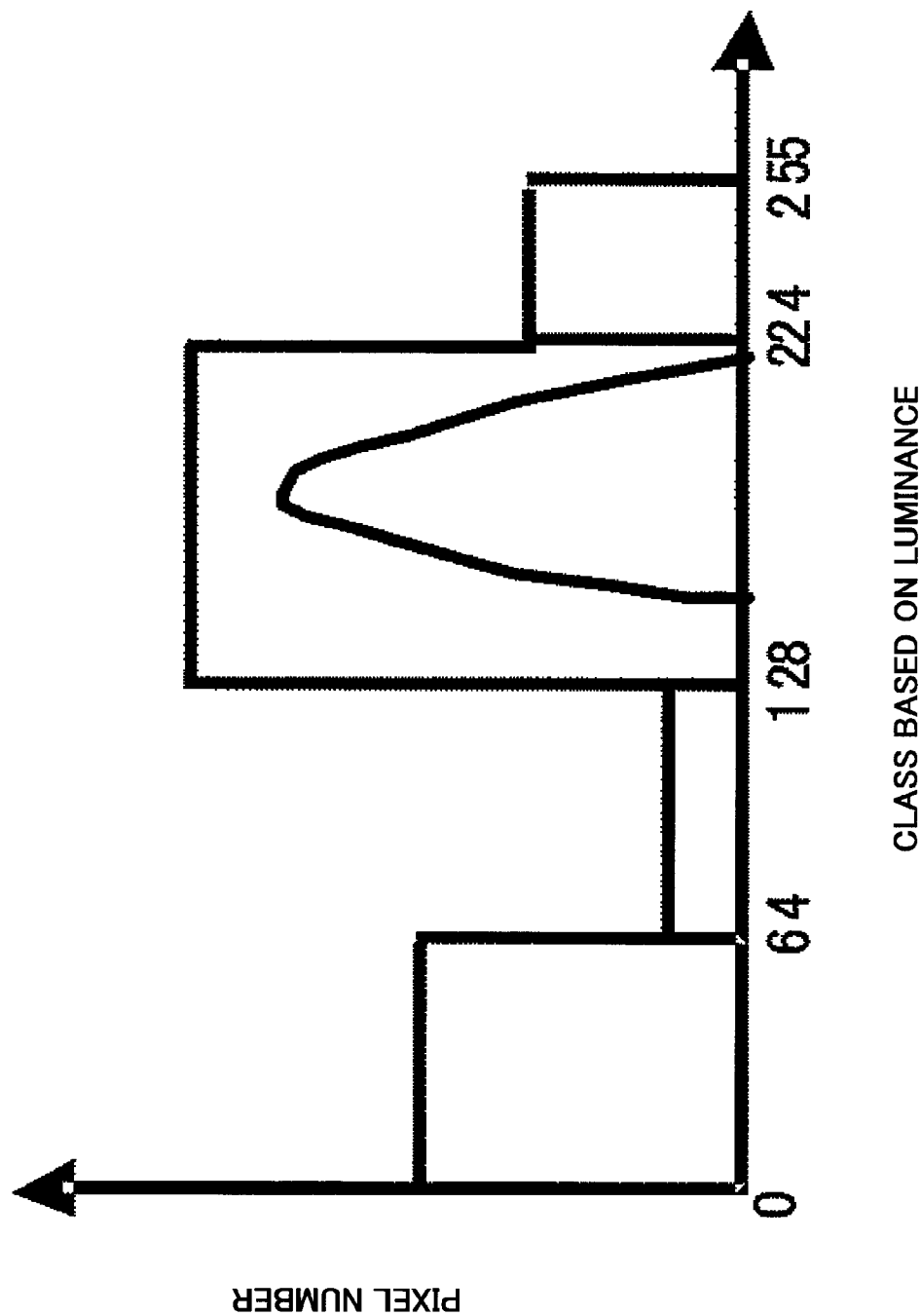
FIG. 28B is a pattern diagram showing one example of a local histogram after the alternation of the setting of the class width.
Figure 29:
FIG. 29 shows a pattern diagram representing one example of an original image and a local area before the luminance conversion.

FIG. 27 is a flowchart representing operations of the image processing unit shown in FIG. 26. FIG. 28A is a pattern diagram showing one example of a local histogram before the setting change of a class width. FIG. 28B is a pattern diagram also showing one example of a local histogram after the setting change of the class width. FIG. 29 is a pattern diagram showing one example of an original image and a local area before the luminance changing.

An example of operations of the global processor 3a of the image processing unit 3B will be first explained hereunder.

The image processing unit 3B calculates an entire global histogram of the original image (step S20). Specifically, as shown in FIG. 28A, the global processor 3a calculates a global histogram gH of the entire original image. A class in this case is made fine in comparison with a case of the local histogram. Further, since this operation is merely a step for determining the class width, it is allowable for an operator to know approximate histogram of the entire original image, and accordingly, the global histogram may be obtained by the decimated data in a skipping manner without scanning one by one (one pixel by one pixel) of the entire image.

Then, the image processing unit 3B extracts the gradation area (step S21). More specifically, the global processor 3a extracts, by using a max-min filter or like, an area of which brightness gradually changes or an area having less change of luminance, such as an area photographing bright sky or dark room, and then determines the gradation area, which is thereafter classified.

Next, the image processing unit 3B determines the class width every gradation area (step S22). More specifically, as shown in FIG. 28B, the global processor 3a determines the class width of the local histogram so as to encompass a portion of a class width R corresponding to the gradation area of the global histogram gH. The class width of the local histogram varies in accordance with the gradation area to which the objective pixel to be processed belongs. Although FIG. 28B shows the example of the bright area such as sky, in a case where a peak exists in the dark area, the class width of the local histogram varies so as to encompass the global histogram gH having lower luminance. If the local histogram does not belong to any gradation area, the class width of the local histogram takes a usual equal distance.

In FIG. 28A, the portion of the class width R corresponding to the gradation area of the global histogram gH straddled between two classes in the local histogram. However, by changing the class, the gradation area may belong to only one class.

Next, the operations of the local processor 3b will be explained.

As like as the steps S1 and S2 of the first embodiment, the image processing apparatus inputs the original image and sets a pixel to be processed (objective pixel).

The image processing unit 3B then sets the local area with the objective pixel being the center (step S25). Specifically, as shown in FIG. 29, the local processor 3b sets a local area 32D with an objective pixel 31D being the center.

Next, the image processing unit 3b determines an area to which the objective pixel belongs (step S26). Specifically, the local processor 3b judges whether the objective pixel belongs to the gradation area or not based on the result of the step S21 of the global processor 3a, and in this judgment, in the case of belonging to the gradation area, it is discriminated to which gradation area this gradation area belongs and then determines the belonging area.

Next, the image processing unit 3B calculates the local histogram in accordance with the class width of the belonging area (step S27). Specifically, the local processor 3b calculates the local histogram in accordance with the class width of the gradation area to which the objective pixel belongs based on the step S22 of the global processor 3a.

As mentioned above, the image processing unit 3B of the image processing apparatus sets the class width of the local histogram based on the information of the original image, and functions as one example of the local histogram calculating means for calculating the local histogram. Further, the image processing unit 3B of the image processing apparatus sets the class width of the local histogram based on the histogram relating to the brightness of the original image and functions as one example of local histogram calculating means for calculating the local histogram based on the class width of the set local histogram.

Then, the image processing unit 3B calculates the local cumulative histogram (step S28). Specifically, this step is basically identical to the step S5 in the first embodiment. However, in the case where the objective pixel belongs to the gradation area, the class width of the local cumulative histogram may differ. Accordingly, the apex position of the local cumulative histogram offsets in the axial direction of the class.

The image processing unit 3B determines the gamma correction function per every bin (step S29). More specifically, this step is substantially identical to the step S6 in the first embodiment. However, in the case where the class width of the local cumulative histogram varies, the apex of the local cumulative histogram determining the gamma correction function may offset.

Next, the image processing unit 3B produces a conversion function by composing the respective gamma correction functions based on the weighting function (step S30). Specifically, this step is substantially identical to the step S7 in the first embodiment. However, in response to the variation of the class width of the local cumulative histogram, the local maximum position of the weighting function may differ.

The image processing unit 3B applies the conversion function to the objective pixel (step S31), and judges whether this pixel is last one or not as in the step S9 in the first embodiment.

Depending on the characteristics of the image, it is possible to carry out more natural image correction by handling the specific luminance area as one group. Considering the shape of the local histogram, by allotting the specific luminance area to one class width, the specific luminance area can be handled as one group. In this case, it is necessary to make the class width variable so as to accord with the specific luminance range.

As one example, an image including a sky area may be considered. The image correction to the sky area can be more naturally carried out by handling one luminance area than causing locally large variation. In a case where the luminance range (128-224) of the pixel group constituting the sky with respect to 8 bit image, when the local histogram is simply divided into four divisions, the ranges become 0-63, 64-127, 128-191 and 192-255, and in such case, the sky area (128-224) straddles two class widths of 128-191 and 192-255. Then, the class widths of 128-191 and 192-255 are adjustable to take 128-225 and 226-255 width class so that the sky area is included in one class width of 128-225.

In order to determine the variable class width, although it is necessary to obtain information of the pixel group of the specific luminance range, the global histogram as statistical amount of the whole image, the image area division, the color information and the like may be utilized.

According to the present embodiment, the amendment of the luminance offset and the contrast between the local areas can be further improved and more fine and natural image can be obtained. As mentioned, the class width of the local histogram can be handled as being variable, and the class width is determined by the global histogram information as the statistical amount of the whole image. It is further to be noted that the present embodiment is applicable to the modified embodiment of the first embodiment and the second embodiment. The processing of the first to third embodiments may be executed by using a computer.

FIG. 30 shows a block diagram representing one example of a schematic structure of a computer that executes an image processing program according to the present invention.

A computer 50 includes a control section 51 for controlling entire structure of the computer 50 and calculating the image processing, a memory section 52 for storing the original image and holding the calculation result of the control section 51, a display section 53 for displaying an image, a text and the like, and an operation section 54 composed of a key-board, a mouth and the like. These sections and components are connected mutually by means of bus 55.

The control section 51 includes a CPU, functions as CPU and performs various image processing.

The memory section 52 includes a PAM (Random Access Memory) a ROM (Read Only Memory) and a hard disc and serves to load image processing program and to form a memory space for holding the image data.

The display section 53 is composed of a CRT (Cathode Ray Tube) and a liquid crystal display element or EL (Electro Luminescence) element and serves to display a processed image and the like.

The control section 51 of the computer 50 is provided with the functions of the CPU 2 of the image processing apparatus 1 of the first and second embodiment and the function of the image processing unit 3B of the third embodiment. In order to improve processing speed of the computer 50, it is preferred for the control section 51 to be provided with a multi-core type computer 50 having a plurality of CPU cores in a CPU package. It is also preferred for the memory section 52 to be composed as a memory operated at high speed for inputting or outputting the data concerning the original image.

Furthermore, the image correction technology in the first to third embodiments may be applicable for various uses such as medical, in-vehicle, monitoring, etc. technologies without being limited to the image processing technology using a camera.

Still furthermore, it is to be noted that the present invention is not limited to the described embodiments and many other changes and modifications which attain substantially the same effects or functions as those of the described embodiments are included in the technical scopes of the present invention as far as they are not apart from the spirits or scopes of the appended claims.

What is claimed is:

1. An image processing apparatus comprising:
an original image inputting unit that accepts an input of an original image to be image-processed;
a local area setting unit that sets a local area, with a pixel of which brightness is to be converted being a center of the local area, from the original image;
a local histogram calculating unit that calculates a local histogram relating to brightness of the local histogram;
a local histogram calculating unit that calculates a local cumulative histogram by accumulating the local histogram;
a monotone increasing function determining unit that determines first and second monotone increasing functions, respectively, corresponding to cumulative frequency values in first and second classes of the local cumulative histogram;
a weighting function determining unit that determines first and second weighting functions, respectively, corresponding to the first and second monotone increasing functions;
a conversion function producing unit that produces a conversion function relating to brightness of the pixel from the first monotone increasing function weighted by the first weighting function and the second monotone increasing function weighted by the second weighting function; and
a conversion unit that converts the brightness of the pixel by the conversion function.

2. The image processing apparatus according to claim 1, wherein the monotone increasing function determining unit is a unit that determines at least one of the first and second monotone increasing functions to a gamma correction function.

3. The image processing apparatus according to claim 1, wherein the monotone increasing function determining unit is a unit that determines at least one of the first and second monotone increasing functions to a linear function.

4. The image processing apparatus according to claim 1, wherein the local histogram calculating unit is a unit that sets a width of a class of the local histogram based on information of the original image and then calculates the local histogram based on the class width of the thus set local histogram.

5. The image processing apparatus according to claim 4, wherein the local histogram calculating unit is a unit that sets a width of a class of the local histogram based on histogram relating to brightness of the original image and then calculates the local histogram based on the class width of the thus set local histogram.

6. The image processing apparatus according to claim 1, wherein the conversion function producing unit is a unit that produces the conversion function by adding the first monotone increasing function weighted by the first weighting function and the monotone increasing function weighted by the second weighting function.

7. The image processing apparatus according to claim 1, wherein the weighting function determining unit is a unit that changes an overlapping ratio of the first and second weighting functions.

8. The image processing apparatus according to claim 1, wherein the weighting function determining unit is a unit that determines the first weighting function having a local maximal value in the first class and the second weighting function having a local maximal value in a second class.

9. The image processing apparatus according to claim 1, further comprising a local cumulative histogram adjusting unit that adjusts a cumulative frequency value in a class of the local cumulative histogram.

10. The image processing apparatus according to claim 9, wherein the local cumulative histogram adjusting unit is a unit that adjusts the cumulative frequency value by setting upper and lower limits of the cumulative frequency values in the class of the local cumulative histogram.

11. An image processing method comprising:
inputting an original image by accepting an input of an original image to be image-processed;
setting a local area, with a pixel of which brightness is to be converted being a center of the local area, from the original image;
calculating a local histogram relating to brightness of the local area;
calculating a local cumulative histogram by accumulating the local histogram;
determining first and second monotone increasing functions, respectively, corresponding to cumulative frequency values in first and second classes of the local cumulative histogram;
determining first and second weighting functions, respectively, corresponding to the first and second monotone increasing functions; and
producing a conversion function relating to brightness of the pixel from the first monotone increasing function weighted by the first weighting function and the second monotone increasing function weighted by the second weighting function.

12. An image processing program stored on a non-transitory computer-readable medium that causes a computer to operate as:
an original image inputting unit that accepts an input of an original image to be image-processed;
a local area setting unit that sets a local area, with a pixel of which brightness is to be converted being a center of the local area, from the original image;
a local histogram calculating unit that calculates a local histogram relating to brightness of the local histogram;
a local histogram calculating unit that calculates a local cumulative histogram by accumulating the local histogram;
a monotone increasing function determining unit that determines first and second monotone increasing functions, respectively, corresponding to cumulative frequency values in first and second classes of the local cumulative histogram;
a weighting determining unit that determines first and second weighting functions, respectively, corresponding to the first and second monotone increasing functions; and
a conversion function producing unit that produces a conversion function relating to brightness of the pixel from the first monotone increasing function weighted by the first weighting function and the second monotone increasing function weighted by the second weighting function.

* * * * *